(12) United States Patent
Martel et al.

(10) Patent No.: US 11,048,488 B2
(45) Date of Patent: Jun. 29, 2021

(54) SOFTWARE CODE OPTIMIZER AND METHOD

(71) Applicant: Pegasystems, Inc., Cambridge, MA (US)

(72) Inventors: Timothy J. Martel, Lexington, MA (US); Nigel Johnson, Duxbury, MA (US); Paul Gagnon, Boston, MA (US); John Arnold, Westborough, MA (US)

(73) Assignee: Pegasystems, Inc., Cambridge, MA (US)

( * ) Notice: Subject to any disclaimer, the term of this patent is extended or adjusted under 35 U.S.C. 154(b) by 42 days.

(21) Appl. No.: 16/539,699

(22) Filed: Aug. 13, 2019

(65) Prior Publication Data

US 2020/0057617 A1 Feb. 20, 2020

Related U.S. Application Data

(60) Provisional application No. 62/718,809, filed on Aug. 14, 2018.

(51) Int. Cl.
*G06F 9/44* (2018.01)
*G06F 8/41* (2018.01)
*G06F 40/154* (2020.01)

(52) U.S. Cl.
CPC .............. *G06F 8/443* (2013.01); *G06F 8/427* (2013.01); *G06F 40/154* (2020.01)

(58) Field of Classification Search
None
See application file for complete search history.

(56) References Cited

U.S. PATENT DOCUMENTS

| 4,047,059 | A | 9/1977 | Rosenthal |
| 4,344,142 | A | 8/1982 | Diehr, II et al. |

(Continued)

FOREIGN PATENT DOCUMENTS

| DE | 19911098 A1 | 12/1999 |
| EP | 0549208 A2 | 6/1993 |

(Continued)

OTHER PUBLICATIONS

DeMichiel, L.G., et al., Polyglot: Extensions to Relational Databases for Sharable Types and Functions in a Multi-Language Environment, Proc. Ninth Int. Conf. on Data Engineering, IEEE, pp. 651-660, Apr. 1993.

(Continued)

*Primary Examiner* — Qamrun Nahar
(74) *Attorney, Agent, or Firm* — Davis Malm D'Agostine, P.C.; David J. Powsner

(57) ABSTRACT

The invention provides, in some aspects, methods of optimizing an app for execution on a client device by identifying components of the app used in such execution by a user having a designated role who accesses the app for download via a designated portal. A component can be, for example, a source code file or portion thereof, including, for example, a portion defining a widget or other user interface element. For each component, the method (i) identifies source code files on which execution of that component depends, e.g., in connection with execution of the particular app by the particular user, and (ii) generates a dependency-ordered stack of the source code files for that component. In further accord with those aspects of the invention, the method combines the dependency-ordered stacks into a single such stack and transfers the source code in an order specified by that stack to the client device for loading and execution.

15 Claims, 7 Drawing Sheets

(56) References Cited

U.S. PATENT DOCUMENTS

| | | |
|---|---|---|
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,337,407 A | 8/1994 | Bates et al. |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,243 A | 10/1998 | Rich et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,909,213 A | 6/1999 | Martin |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,983,369 A | 11/1999 | Bakoglu et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |

(56) References Cited

U.S. PATENT DOCUMENTS

| | | | |
|---|---|---|---|
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,310,951 B1 | 10/2001 | Wineberg et al. |
| 6,311,324 B1 | 10/2001 | Smith et al. |
| 6,313,834 B1 | 11/2001 | Lau et al. |
| 6,314,415 B1 | 11/2001 | Mukherjee |
| 6,321,273 B1* | 11/2001 | Schofield ............... G06F 9/465 709/203 |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,356,897 B1 | 3/2002 | Gusack |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,807,632 B1 | 10/2004 | Carpentier et al. |
| 6,810,429 B1 | 10/2004 | Walsh et al. |

(56) References Cited

U.S. PATENT DOCUMENTS

| | | |
|---|---|---|
| 6,820,082 B1 | 11/2004 | Cook et al. |
| 6,829,655 B1 | 12/2004 | Huang et al. |
| 6,831,668 B2 | 12/2004 | Cras et al. |
| 6,836,275 B1 | 12/2004 | Arquie et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,978,719 B2 | 12/2005 | Sebata et al. |
| 6,985,912 B2 | 1/2006 | Mullins et al. |
| 6,991,153 B2 | 1/2006 | Silverbrook et al. |
| 7,020,869 B2 | 3/2006 | Abrari et al. |
| 7,020,882 B1 | 3/2006 | Lewallen |
| 7,028,225 B2 | 4/2006 | Maso et al. |
| 7,031,901 B2 | 4/2006 | Abu El Ata |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,194,690 B2 | 3/2007 | Guillermo et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,353,254 B2 | 4/2008 | Kusuda |
| 7,398,391 B2 | 7/2008 | Carpentier et al. |
| 7,406,475 B2 | 7/2008 | Dorne et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayemick et al. |
| 7,596,504 B2 | 9/2009 | Hughes et al. |
| 7,603,625 B2 | 10/2009 | Guillermo et al. |
| 7,640,222 B2 | 12/2009 | Trefler |
| 7,647,417 B1 | 1/2010 | Taneja |
| 7,665,063 B1 | 2/2010 | Trefler et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B1 | 8/2010 | Chotin et al. |
| 7,783,596 B2 | 8/2010 | Smolen et al. |
| 7,787,609 B2 | 8/2010 | Flockhart et al. |
| 7,791,559 B2 | 9/2010 | Piasecki |
| 7,818,506 B1 | 10/2010 | Shepstone et al. |
| 7,844,594 B1 | 11/2010 | Holt et al. |
| 7,870,244 B2 | 1/2011 | Chong et al. |
| 7,889,896 B2 | 2/2011 | Roehrig et al. |
| 7,937,690 B2 | 5/2011 | Casey |
| 7,971,180 B2 | 6/2011 | Kreamer et al. |
| 7,974,714 B2 | 7/2011 | Hoffberg |
| 7,983,895 B2 | 7/2011 | McEntee et al. |
| 8,001,519 B2 | 8/2011 | Conallen et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 | 2/2013 | Eismann et al. |
| 8,468,492 B1 | 6/2013 | Frenkel |
| 8,479,157 B2 | 7/2013 | Trefler et al. |
| 8,516,193 B1 | 8/2013 | Clinton et al. |
| 8,739,044 B1 | 5/2014 | Varadarajan |
| 8,744,999 B2 | 6/2014 | Clarke et al. |
| 8,843,435 B1 | 9/2014 | Trefler et al. |
| 8,850,362 B1 | 9/2014 | Khoshnevisan et al. |
| 8,863,008 B2 | 10/2014 | Chan et al. |
| 8,880,487 B1 | 11/2014 | Clinton et al. |
| 8,903,933 B1 | 12/2014 | Bellini, III et al. |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,253,129 B2 | 2/2016 | Bassemir et al. |
| 9,270,743 B2 | 2/2016 | Frenkel |
| 9,495,340 B2 | 11/2016 | Powell et al. |
| 9,658,735 B2 | 5/2017 | Trefler et al. |
| 9,678,719 B1 | 6/2017 | Frenkel |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0065912 A1 | 5/2002 | Catchpole et al. |
| 2002/0070972 A1 | 6/2002 | Windl et al. |
| 2002/0073337 A1 | 6/2002 | Ioele et al. |
| 2002/0083063 A1 | 6/2002 | Egolf |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120627 A1 | 8/2002 | Mankoff |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2002/0186826 A1 | 12/2002 | Hsu et al. |
| 2002/0198935 A1 | 12/2002 | Crandall, Sr. et al. |
| 2003/0001894 A1 | 1/2003 | Boykin et al. |

(56) References Cited

U.S. PATENT DOCUMENTS

| | | |
|---|---|---|
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037076 A1* | 2/2003 | Bravery ............... G06F 40/117 715/235 |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0093279 A1 | 5/2003 | Malah et al. |
| 2003/0098991 A1 | 5/2003 | Laverty et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0003043 A1 | 1/2004 | Rajamony et al. |
| 2004/0021686 A1 | 2/2004 | Barberis |
| 2004/0024603 A1 | 2/2004 | Mahoney et al. |
| 2004/0034651 A1 | 2/2004 | Gupta et al. |
| 2004/0049479 A1 | 3/2004 | Dome et al. |
| 2004/0049509 A1 | 3/2004 | Keller et al. |
| 2004/0049580 A1 | 3/2004 | Boyd et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Rippert, Jr. et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |
| 2004/0145607 A1 | 7/2004 | Alderson |
| 2004/0147138 A1 | 7/2004 | Vaartstra |
| 2004/0148152 A1 | 7/2004 | Horikawa |
| 2004/0148586 A1 | 7/2004 | Gilboa |
| 2004/0162812 A1 | 8/2004 | Lane et al. |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0243587 A1 | 12/2004 | Nuyens et al. |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0027871 A1 | 2/2005 | Bradley et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0071211 A1 | 3/2005 | Flockhart et al. |
| 2005/0096959 A1 | 5/2005 | Kumar et al. |
| 2005/0104628 A1 | 5/2005 | Tanzawa et al. |
| 2005/0125683 A1 | 6/2005 | Matsuyama et al. |
| 2005/0132048 A1 | 6/2005 | Kogan et al. |
| 2005/0138162 A1 | 6/2005 | Byrnes |
| 2005/0144023 A1 | 6/2005 | Aboujaoude et al. |
| 2005/0165823 A1 | 7/2005 | Ondrusek et al. |
| 2005/0198021 A1 | 9/2005 | Wilcox et al. |
| 2005/0216235 A1 | 9/2005 | Butt et al. |
| 2005/0222889 A1 | 10/2005 | Lai et al. |
| 2005/0228875 A1 | 10/2005 | Monitzer et al. |
| 2005/0234882 A1 | 10/2005 | Bennett et al. |
| 2005/0267770 A1 | 12/2005 | Banavar et al. |
| 2005/0288920 A1 | 12/2005 | Green et al. |
| 2006/0004845 A1 | 1/2006 | Kristiansen et al. |
| 2006/0015388 A1 | 1/2006 | Flockhart et al. |
| 2006/0020783 A1 | 1/2006 | Fisher |
| 2006/0041861 A1 | 2/2006 | Trefler et al. |
| 2006/0053125 A1 | 3/2006 | Scott |
| 2006/0063138 A1 | 3/2006 | Loff et al. |
| 2006/0064486 A1 | 3/2006 | Baron et al. |
| 2006/0064667 A1 | 3/2006 | Freitas |
| 2006/0075360 A1 | 4/2006 | Bixler |
| 2006/0080082 A1 | 4/2006 | Ravindra et al. |
| 2006/0080401 A1 | 4/2006 | Gill et al. |
| 2006/0092467 A1 | 5/2006 | Dumitrescu et al. |
| 2006/0100847 A1 | 5/2006 | McEntee et al. |
| 2006/0101386 A1 | 5/2006 | Gerken et al. |
| 2006/0101393 A1 | 5/2006 | Gerken et al. |
| 2006/0106846 A1 | 5/2006 | Schulz et al. |
| 2006/0139312 A1 | 6/2006 | Sinclair et al. |
| 2006/0149751 A1 | 7/2006 | Jade et al. |
| 2006/0167655 A1 | 7/2006 | Barrow et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0209085 A1 | 9/2006 | Wong et al. |
| 2006/0218166 A1 | 9/2006 | Myers et al. |
| 2006/0271559 A1 | 11/2006 | Stavrakos et al. |
| 2006/0271920 A1 | 11/2006 | Abouelsaadat |
| 2006/0288348 A1 | 12/2006 | Kawamoto et al. |
| 2007/0005623 A1 | 1/2007 | Self et al. |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0100782 A1 | 5/2007 | Reed et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143163 A1 | 6/2007 | Weiss et al. |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0226031 A1 | 9/2007 | Manson et al. |
| 2007/0233902 A1 | 10/2007 | Trefler et al. |
| 2007/0239646 A1 | 10/2007 | Trefler |
| 2007/0245300 A1 | 10/2007 | Chan et al. |
| 2007/0260584 A1 | 11/2007 | Marti et al. |
| 2007/0294644 A1 | 12/2007 | Yost |
| 2008/0002823 A1 | 1/2008 | Fama et al. |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0109467 A1 | 5/2008 | Brookins et al. |
| 2008/0120593 A1 | 5/2008 | Keren et al. |
| 2008/0134088 A1 | 6/2008 | Tse et al. |
| 2008/0163253 A1 | 7/2008 | Massmann et al. |
| 2008/0184230 A1 | 7/2008 | Leech et al. |
| 2008/0189679 A1 | 8/2008 | Rodriguez et al. |
| 2008/0195377 A1 | 8/2008 | Kato et al. |
| 2008/0196003 A1 | 8/2008 | Gerken et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2008/0263510 A1 | 10/2008 | Nerome et al. |
| 2008/0297482 A1 | 12/2008 | Weiss |
| 2009/0007084 A1 | 1/2009 | Conallen et al. |
| 2009/0018998 A1 | 1/2009 | Patten, Jr. et al. |
| 2009/0075634 A1 | 3/2009 | Sinclair et al. |
| 2009/0083697 A1 | 3/2009 | Zhang et al. |

(56) References Cited

U.S. PATENT DOCUMENTS

| | | | |
|---|---|---|---|
| 2009/0094588 A1* | 4/2009 | Chipman | G06F 9/4488 717/141 |
| 2009/0132232 A1 | 5/2009 | Trefler | |
| 2009/0132996 A1 | 5/2009 | Eldridge et al. | |
| 2009/0138844 A1 | 5/2009 | Halberstadt et al. | |
| 2009/0150541 A1 | 6/2009 | Georgis | |
| 2009/0158213 A1 | 6/2009 | Ryu | |
| 2009/0158407 A1 | 6/2009 | Nicodemus et al. | |
| 2009/0164494 A1 | 6/2009 | Dodin | |
| 2009/0171938 A1 | 7/2009 | Levin et al. | |
| 2009/0199123 A1 | 8/2009 | Albertson et al. | |
| 2009/0228786 A1 | 9/2009 | Danton et al. | |
| 2009/0271708 A1 | 10/2009 | Peters et al. | |
| 2009/0276206 A1 | 11/2009 | Fitzpatrick et al. | |
| 2009/0282384 A1 | 11/2009 | Keppler | |
| 2009/0319948 A1 | 12/2009 | Stannard et al. | |
| 2010/0011338 A1 | 1/2010 | Lewis | |
| 2010/0083135 A1 | 4/2010 | Zawacki et al. | |
| 2010/0088266 A1 | 4/2010 | Trefler | |
| 2010/0107137 A1 | 4/2010 | Trefler et al. | |
| 2010/0149109 A1 | 6/2010 | Elias | |
| 2010/0169863 A1* | 7/2010 | Adams | G06F 8/20 717/120 |
| 2010/0217737 A1 | 8/2010 | Shama | |
| 2011/0016422 A1 | 1/2011 | Miyazawa et al. | |
| 2011/0066486 A1 | 3/2011 | Bassin et al. | |
| 2011/0072373 A1 | 3/2011 | Yuki | |
| 2011/0148791 A1 | 6/2011 | Luu | |
| 2011/0214067 A1 | 9/2011 | Tanaka | |
| 2011/0239113 A1 | 9/2011 | Hung et al. | |
| 2011/0252305 A1 | 10/2011 | Tschani et al. | |
| 2011/0264251 A1 | 10/2011 | Copello et al. | |
| 2012/0041921 A1 | 2/2012 | Canaday et al. | |
| 2012/0050530 A1 | 3/2012 | Raman et al. | |
| 2012/0102420 A1 | 4/2012 | Fukahori | |
| 2012/0198367 A1 | 8/2012 | Bornheimer et al. | |
| 2012/0272186 A1 | 10/2012 | Kraut | |
| 2012/0290939 A1 | 11/2012 | Yu et al. | |
| 2012/0293558 A1 | 11/2012 | Dilts | |
| 2012/0306773 A1 | 12/2012 | Yeung | |
| 2013/0007267 A1 | 1/2013 | Khatutsky | |
| 2013/0031455 A1 | 1/2013 | Griffiths et al. | |
| 2013/0047165 A1 | 2/2013 | Goetz et al. | |
| 2013/0067392 A1 | 3/2013 | Leonard et al. | |
| 2013/0120319 A1 | 5/2013 | Givon | |
| 2013/0120434 A1 | 5/2013 | Kim | |
| 2013/0135294 A1 | 5/2013 | An | |
| 2013/0159904 A1 | 6/2013 | Kelappan et al. | |
| 2013/0167245 A1 | 6/2013 | Birtwhistle et al. | |
| 2013/0179816 A1 | 7/2013 | Seo et al. | |
| 2013/0231970 A1 | 9/2013 | Trefler et al. | |
| 2013/0254833 A1 | 9/2013 | Nicodemus et al. | |
| 2013/0262842 A1* | 10/2013 | Chiba | G06F 8/443 712/226 |
| 2013/0290249 A1 | 10/2013 | Merriman et al. | |
| 2013/0335339 A1 | 12/2013 | Maunder | |
| 2014/0019400 A1 | 1/2014 | Trefler et al. | |
| 2014/0082539 A1 | 3/2014 | Tjissen | |
| 2014/0089819 A1 | 3/2014 | Andler et al. | |
| 2014/0125577 A1 | 5/2014 | Hoang et al. | |
| 2014/0137019 A1 | 5/2014 | Paulsen et al. | |
| 2014/0258860 A1 | 9/2014 | Subramanian | |
| 2014/0277164 A1 | 9/2014 | Ramsay et al. | |
| 2014/0313135 A1 | 10/2014 | Pisters et al. | |
| 2014/0325410 A1 | 10/2014 | Jung et al. | |
| 2015/0058772 A1 | 2/2015 | Bator et al. | |
| 2015/0074606 A1 | 3/2015 | Melen | |
| 2015/0089406 A1 | 3/2015 | Trefler et al. | |
| 2015/0127736 A1 | 5/2015 | Frenkel | |
| 2015/0220315 A1* | 8/2015 | Chiba | G06F 8/40 717/149 |
| 2016/0041961 A1 | 2/2016 | Romney | |
| 2016/0062963 A1 | 3/2016 | Umapathy | |
| 2016/0070560 A1 | 3/2016 | Chase | |
| 2016/0085809 A1 | 3/2016 | de Castro Alves et al. | |
| 2016/0098298 A1 | 4/2016 | Trefler et al. | |
| 2016/0105370 A1 | 4/2016 | Mellor et al. | |
| 2017/0013073 A1 | 1/2017 | Mendez et al. | |
| 2017/0083311 A1 | 3/2017 | Adams | |
| 2017/0090685 A1 | 3/2017 | Lockwood et al. | |
| 2017/0109032 A1 | 4/2017 | MeLinand et al. | |
| 2017/0242582 A1 | 8/2017 | Yaremko | |
| 2017/0255341 A1 | 9/2017 | Trefler et al. | |
| 2017/0351425 A1 | 12/2017 | Dangelo et al. | |
| 2017/0357703 A1 | 12/2017 | Theimer et al. | |
| 2018/0011678 A1 | 1/2018 | Shipper et al. | |
| 2018/0024901 A1 | 1/2018 | Tankersley et al. | |
| 2018/0067580 A1 | 3/2018 | Bonnery et al. | |

FOREIGN PATENT DOCUMENTS

| | | |
|---|---|---|
| EP | 1163604 A2 | 12/2001 |
| EP | 1183636 A1 | 3/2002 |
| EP | 1196882 A1 | 4/2002 |
| EP | 1203310 A1 | 5/2002 |
| EP | 1208482 A1 | 5/2002 |
| EP | 1212668 A2 | 6/2002 |
| EP | 1240592 A1 | 9/2002 |
| EP | 1277102 A2 | 1/2003 |
| EP | 1277119 A1 | 1/2003 |
| EP | 1277120 A1 | 1/2003 |
| EP | 1277153 A1 | 1/2003 |
| EP | 1277155 A1 | 1/2003 |
| EP | 1277329 A1 | 1/2003 |
| EP | 1374083 A1 | 1/2004 |
| EP | 1382030 A2 | 1/2004 |
| EP | 1386241 A1 | 2/2004 |
| EP | 1393172 A2 | 3/2004 |
| EP | 1393188 A1 | 3/2004 |
| EP | 1402336 A2 | 3/2004 |
| EP | 1407384 A1 | 4/2004 |
| EP | 1430396 A1 | 6/2004 |
| EP | 1438649 A1 | 7/2004 |
| EP | 1438654 A1 | 7/2004 |
| EP | 1438672 A1 | 7/2004 |
| EP | 1483685 A1 | 12/2004 |
| EP | 1490747 A1 | 12/2004 |
| EP | 1490809 A1 | 12/2004 |
| EP | 1492232 A1 | 12/2004 |
| EP | 1782183 A2 | 5/2007 |
| EP | 1830312 A1 | 9/2007 |
| EP | 1840803 A1 | 10/2007 |
| EP | 2115581 A1 | 11/2009 |
| GB | 2555157 | 4/2018 |
| WO | 9838564 A2 | 9/1998 |
| WO | 9840807 A1 | 9/1998 |
| WO | 9905632 A1 | 2/1999 |
| WO | 9945465 A1 | 9/1999 |
| WO | 9950784 A1 | 10/1999 |
| WO | 0033187 A1 | 6/2000 |
| WO | 0033217 A1 | 6/2000 |
| WO | 0033226 A1 | 6/2000 |
| WO | 0033235 A1 | 6/2000 |
| WO | 0033238 A2 | 6/2000 |
| WO | 0052553 A2 | 9/2000 |
| WO | 0052603 A1 | 9/2000 |
| WO | 0067194 A2 | 11/2000 |
| WO | 0140958 A1 | 6/2001 |
| WO | 0175610 A1 | 10/2001 |
| WO | 0175614 A1 | 10/2001 |
| WO | 0175747 A1 | 10/2001 |
| WO | 0175748 A1 | 10/2001 |
| WO | 0176206 A1 | 10/2001 |
| WO | 0177287 A2 | 10/2001 |
| WO | 0179994 A2 | 10/2001 |
| WO | 0219131 A1 | 3/2002 |
| WO | 0221254 A2 | 3/2002 |
| WO | 2002019131 | 3/2002 |
| WO | 0244947 A2 | 6/2002 |
| WO | 02056249 A2 | 7/2002 |
| WO | 02080006 A1 | 10/2002 |
| WO | 02080015 A1 | 10/2002 |
| WO | 02082300 A1 | 10/2002 |
| WO | 02084925 A2 | 10/2002 |

(56) References Cited

FOREIGN PATENT DOCUMENTS

| | | | |
|---|---|---|---|
| WO | 02088869 | A2 | 11/2002 |
| WO | 02091346 | A1 | 11/2002 |
| WO | 02101517 | A2 | 12/2002 |
| WO | 02103576 | A1 | 12/2002 |
| WO | 03021393 | A2 | 3/2003 |
| WO | 03029923 | A2 | 4/2003 |
| WO | 03029955 | A1 | 4/2003 |
| WO | 03030005 | A1 | 4/2003 |
| WO | 03030013 | A1 | 4/2003 |
| WO | 03030014 | A1 | 4/2003 |
| WO | 03058504 | A1 | 7/2003 |
| WO | 03069500 | A1 | 8/2003 |
| WO | 03071380 | A2 | 8/2003 |
| WO | 03071388 | A2 | 8/2003 |
| WO | 03073319 | A2 | 9/2003 |
| WO | 03077139 | A1 | 9/2003 |
| WO | 03085503 | A1 | 10/2003 |
| WO | 03085580 | A1 | 10/2003 |
| WO | 2004001613 | A1 | 12/2003 |
| WO | 2004003684 | A2 | 1/2004 |
| WO | 2004003766 | A1 | 1/2004 |
| WO | 2004003885 | A1 | 1/2004 |
| WO | 2004046882 | A2 | 6/2004 |
| WO | 2004061815 | A1 | 7/2004 |
| WO | 2004086197 | A2 | 10/2004 |
| WO | 2004086198 | A2 | 10/2004 |
| WO | 2004095207 | A2 | 11/2004 |
| WO | 2004095208 | A2 | 11/2004 |
| WO | 2004114147 | A1 | 12/2004 |
| WO | 2005001627 | A2 | 1/2005 |
| WO | 2005003888 | A2 | 1/2005 |
| WO | 2005010645 | A2 | 2/2005 |
| WO | 2005117549 | A2 | 12/2005 |
| WO | 2006081536 | A2 | 8/2006 |
| WO | 2007033922 | A2 | 3/2007 |
| WO | 2008109441 | A1 | 9/2008 |
| WO | 2009097384 | A1 | 8/2009 |

OTHER PUBLICATIONS

Devarakonda et al., Predictability of process resource usage: A measurement-based study on UNIX. IEEE Transactions on Software Engineering. 1989;15(12)1579-1586.
Communication for European Patent Application No. 05755530.2, dated Sep. 6, 2007 (2 pages).
European Search Report for Application No. 0575553 0.2, dated Mar. 26, 2012 (3 Pages).
European Office Action dated Aug. 31, 2012 for Application No. 05755530.2 (4 Pages).
Communication for European Patent Application No. 07250844.3 enclosing European Search Report, dated Jul. 11, 2007 (6 pages).
Communication for European Patent Application No. 07250844.3, dated Mar. 28, 2008 ( 1 page).
European Office Action dated Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 0873 1127.0, dated Oct. 13, 2009 (2 pages).
Extended European Search Report dated Oct. 29, 2012 for Application No. 08731127.0 (8 Pages).
Extended European Search Report for Application No. 151893 85.6, dated Dec. 17, 2015 (8 pages).
Fayad, M.E, et al., Object-oriented application frameworks. Communications of the ACM, Oct. 1997, vol. 40, issue 10, pp. 32-38, http://dl.acm.org/citation.cfmid=262798.
Francisco, S., et al. Rule-Based Web Page Generation, Proceedings of the 2nd Workshop on Adaptive Hypertext and Hypermedia, Hypertext98, Jun. 20-24, 1998, 9 pages.
Gajos et al. SUPPLE: Automatically Generating User Interfaces. IUI 2004, 8 pages.
Hague, Darren, Universal Worklist with SAP Netweaver Portal. Galileo Press, 2008, pp. 11-31. http://www.sap-hefte.de/download/dateien/14611146leseprobe.pdf.
International Search Report and Written Opinion for Application No. PCT/GB2004/000677, dated Aug. 2, 2004 (15 pages).
International Search Report for Application No. PCT/US2004/020783, dated Nov. 8, 2005 (2 pages).
International Preliminary Report on Patentability for Application No. PCT/US2004/020783, dated Feb. 13, 2006 (6 pages).
International Search Report for PCT/US05/018599, dated May 15, 2007 (1 page).
[NoAuthorListed] XPath Tutorial, Mar. 18, 2005, 7 pages (Year:2005).
Summons to Attend Oral Proceedings pursuant to rule 115( 1) EPC, issued May 2, 2018 for Application No. 0873 1127.0 (8 pages).
U.S. Appl. No. 08/666,165, filed Jun. 19, 1996, Rules Bases and Methods of Access Thereof.
U.S. Appl. No. 10/430,693, filed May 6, 2003, Methods and Apparatus for Digital Data Processing With Mutable Inheritance.
U.S. Appl. No. 10/547,014, filed Aug. 25, 2005, Classification Using Probability Estimate Re-Sampling.
U.S. Appl. No. 10/639,735, filed Aug. 12, 2003, ProcessNiewer Interface.
U.S. Appl. No. 10/854,017, filed May 26, 2004, Integration of Declarative Rule-Based Processing With Procedural Programming.
U.S. Appl. No. 11/046,211, filed Jan. 28, 2005, Methods and Apparatus for Work Management and Routing.
U.S. Appl. No. 11/203,513, filed Aug. 12, 2005, Methods and Apparatus for Digital Data Processing With Mutable Inheritance.
U.S. Appl. No. 11/368,360, filed Mar. 3, 2006, Rules Base Systems and Methods With Circumstance Translation.
U.S. Appl. No. 11/396,415, filed Mar. 30, 2006, User Interface Methods and Apparatus for Rules Processing.
Kuhn, H.W., The Hungarian Method for the Assignment Problem, Naval Research Logistics Quarterly, 2 (1955), pp. 83-97.
Kuno, H.A., and E.A. Rundensteiner, Augmented Inherited MultiIndex Structure for Maintenance of Materialized Path Query Views, Proc. Sixth Int. Workshop on Research Issues in Data Engineering, pp. 128-137, Feb. 1996.
LaRue, J., Leveraging Integration and Workflow. Integrated Solutions, Accounting Today, SourceMedia, Aug. 2006, pp. 18-19.
Lippert, Eric, Fabulous Adventures in Coding: Metaprogrannning, Toast and the Future of Development Tools, Microsoft.com Blog, MSDN Home, published Mar. 4, 2004, 6 pgs.
Mandal, et al., Integrating existing scientific workflow systems: The kepler/pegasus example. USC Information Sciences Institute, 2007, 8 pages.
Manghi, Paolo, et. al., Hybrid Applications Over XML: Integrating the Procedural and Declarative Approaches, 2002 ACM, pp. 1-6. Retrieved Mar. 22, 2007.
Markiewicz, M.E., et al., Object oriented framework development ACM, 2001, 13 pages, http://dl.acm.org/citation.cfmid372771.
Markowitz, V.M., and A. Shoshani, Object Queries over Relational Databases: Language, Implementation, and Applications, IEEE Xplore, pp. 71-80, Apr. 1993.
Marmel, Elaine, Microsoft Office Project 2007 Bible, ISBN 0470009926, Wiley Publishing, Inc., 2007, 961 pages.
Maryanski, F., et al., The Data Model Compiler a Tool for Generating Object-Oriented Database Systems, 1986 Int. Workshop on Object-Oriented Database Systems, IEEE, 73-84 (1986).
McConnell, Steven C., Brooks Law Repealed, IEEE Software, pp. 6-9, Nov./Dec. 1999.
Mecca, G., et al., Cut and Paste, ACM, pp. 1-25 and Appendix I-IV (Jun. 1999). Retrieved Mar. 22, 2007.
Mitchell, T.M., Machine Learning, Chapter 3, 1997, McGraw-Hill, pp. 52-80.
Mitchell, T.M., Machine Learning, Chapter 6, 1997, McGraw-Hill, pp. 154-200.
Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.

(56) References Cited

OTHER PUBLICATIONS

Pientka, B., et al., Prograrnning with proofs and explicit contexts. International Symposium on Principles and Practice of Declarative Prograrnning, ACM, 2008, pp. 163-173, http://delivery.acm.org/10.II45/1390000/1389469/pI63-pientka.pdf.
Reinersten, Don, Is It Always a Bad Idea to Add Resources to a Late Project, Oct. 30, 2000. Electronic Design. vol. 48, Issue 22, p. 70.
Riccuiti, M., Oracle 8.0 on the way with objects: upgrade will also build in multidimensional engine. Info World. Sep. 25, 1995;17(39):16.
Richner, T., et al., Recovering high-level views of object-oriented applications from static and dynamic information. IEEE, 1999, 10 pages, http://ieeexplore.ieee.org/stamp/stamp.jsptp= arnumber= F792487.
Salvini, S., and M.H. Williams, Knowledge Management for Expert Systems, IEEE Colloquium on Knowledge Engineering, 3 pages, May 1990.
Schiefelbein, Mark, A Backbase Ajax Front-end for J2EE Applications, Internet Article, dev2dev http://dev2dev.bea.com/Ipt/a/433 , Aug. 29, 2005, 16 pages.
Sellis, T., et al., Coupling Production Systems and Database Systems: A Homogeneous Approach, IEEE Trans. on Knowledge and Data Engineering, vol. 5(2), pp. 240-256, Apr. 1993.
Shyy Y.M., and S.Y.W. Su, Refinement Preservation for Rule Selection in Active Object-Oriented Database Systems, Proc. Fourth Intl. Workshop on Research Issues in Data Engineering, pp. 115-123, Feb. 1994.
Singh, G., et al., Workflow task clustering for best effort systems with pegasus, Pegasus, 2008, 8 pages.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Srinivasan, V., et al., Object persistence in object-oriented applications. IBM Systems Journal, 1997, vol. 36, issue 1, pp. 66-87, http://ieeexplore.ieee.org/stamp/stamp.jsptp= arnumber-5387186.
Stonebraker, M., The Integration of Rule Systems and Database Systems, IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Thuraisingham, "From Rules to Frames and Frames to Rules," AI Expert, pp. 31-39, Oct. 1989.
Vranes, S., et al., Integrating Multiple Paradigms within the Blackboard Framework, IEEE Transactions on Software Engineering, vol. 21, No. 3, Mar. 1995, pp. 244-262.
Yang, Bibo; Geunes, Joseph; OBrien, William J.; ResourceConstrained Project Scheduling: Past Work and New Directions, Apr. 2001, 28 pages, Research Report 2001-2006, Department of Industrial and Systems Engineering, University of Florida.
U.S. Appl. No. 15/613,439, filed Jun. 5, 2017, Connecting Graphical Shapes Using Gestures.
U.S. Appl. No. 15/206,956, filed Jul. 11, 2016, Selective Sharing for Collaborative Application Usage.
U.S. Appl. No. 11/681,269, filed Mar. 2, 2007, Proactive Performance Management for Multi-User Enterprise Software Systems.
U.S. Appl. No. 12/035,682, filed Feb. 22, 2008, User Interface Methods and Apparatus for Rules Processing.
U.S. Appl. No. 12/174,624, filed Jul. 16, 2008, Methods and Apparatus for Implementing Multilingual Software Applications.
U.S. Appl. No. 12/381,523, filed Mar. 12, 2009, Techniques for Dynamic Data Processing.
U.S. Appl. No. 12/386,959, filed Apr. 24, 2009, Method and Apparatus for Integrated Work Management.
U.S. Appl. No. 12/590,454, filed Nov. 6, 2009, Techniques for Content-Based Caching in a Computer System.
U.S. Appl. No. 12/619,215, filed Nov. 16, 2009, Rules Base Systems and Methods With Circumstance Translation.
U.S. Appl. No. 12/649,095, filed Dec. 29, 2009, Methods and Apparatus for Integration of Declarative Rule-Based Processing With Procedural Programming in a Digital Data-Processing Evironment.
U.S. Appl. No. 12/798,161, filed Mar. 30, 2010, System and Method for Creation and Modification of Software Applications.
U.S. Appl. No. 13/031,097, filed Feb. 18, 2011, Systems and Methods for Distributed Rules Processing.
U.S. Appl. No. 13/031,109, filed Feb. 18, 2011, Rule-Based User Interface Conformance Methods.
U.S. Appl. No. 13/341,411, filed Dec. 30, 2011, System and Method for Updating or Modifying an Application Without Manual Coding.
U.S. Appl. No. 13/536,079, filed Jun. 28, 2012, Proactive Performance Management for Multi-User Enterprise Software Systems.
U.S. Appl. No. 13/718,255, filed Dec. 18, 2012, Methods and Apparatus for Work Management and Routing.
U.S. Appl. No. 13/892,956, filed May 13, 2013, Content-Based Caching Using a Content Identifier at a Point in Time.
U.S. Appl. No. 13/897,763, filed May 20, 2013, System and Software for Creation and Modification of Software.
U.S. Appl. No. 13/907,287, filed May 31, 2013, Methods and Apparatus for Integration of Declarative Rule-Based Processing With Procedural Programming in a Digital Data-Processing Environment.
U.S. Appl. No. 14/469,208, filed Aug. 26, 2014, Techniques for Dynamic Data Processing.
U.S. Appl. No. 14/527,348, filed Oct. 29, 2014, Systems and Methods for Distributed Rules Processing.
U.S. Appl. No. 14/558,084, filed Dec. 2, 2014, Methods and Apparatus for User Interface Optimization.
U.S. Appl. No. 14/597,207, filed Jan. 14, 2015, Methods and Apparatus for Integrated Work Management.
U.S. Appl. No. 14/928,085, filed Oct. 30, 2015, System and Method for Updating or Modifying an Application Without Manual Coding.
International Preliminary Report on Patentability for PCT/US2005/018599, dated Jun. 5, 2007 (10 pages).
International Search Report Written Opinion for PCT/US06/03160, dated Jul. 21, 2008 (16 pages).
International Preliminary Report on Patentability for PCT /US06/03160, dated Apr. 9, 2009 (14 pages).
International Search Report for PCT/US013/55503, dated Jul. 28, 2008 ( 1 page).
International Preliminary Report on Patentability for PCT/US2008/055503, dated Sep. 17, 2009 (4 pages).
International Search Report Written Opinion for PCT/US09/32341, dated Mar. 11, 2009 (14 pages).
International Preliminary Report on Patentability for PCT/US2009/032341, dated Aug. 12, 2010 (8 pages).
Johnson et al., Sharing and resuing rules—a feature comparison of five expert system shells. IEEE Expert, IEEE Services Center, New York, NY, vol. 9, No. 3, Jun. 1, 1994, pp. 3-17.
Jones et al., A user-centered approach to functions in excel. International Conference on Functional Programming, Uppsala, Jun. 30, 2003, pp. 1-12.
Kim, W, Object-Oriented Databases: Definition and Research Directions, IEEE Trans. on Knowledge and Data Engineering, vol. 2(3) pp. 327-341, Sep. 1990.
XPath Tutorial, Mar. 18, 2005, 7 pages (Year: 2005).
Eisenstein, et al., Adaptation in Automated User-Interface Design. IUI, 2000, pp. 74-81.
Simpson, Alan, et al., Access 97 for Windows 95/NT, 1997 Sybex,16 pages, USPTO STIC-EIC 2100/2400.
Ceri, S., et al., WIDE—A distributed architecture for workflow management. Proceedings. Seventh International Workshop on Research Issues in Data Engineering, IEEE, 1997, pp. 76-79, 1997.
Deelman, E., et al., Workflows and e-science: An overview of workflow system features and capabilities. Future Generation Computer Systems, May 2009, vol. 25, issue 5, pp. 528-540.
Kappel, G., et al., TriGSflow active object-oriented workflow management.Proceedings of the 28th Annual Hawaii International Conference on System Sciences. 1995, pp. 727-736.

(56) References Cited

OTHER PUBLICATIONS

Manolescu, D.A., et al., Dynamic object model and adaptive workflow. Proceedings of Metadata and Active Object-Model Pattern Mining Workshop co-located with OOPSLA, 1999, vol. 99, 19 pages.
Schulze, W., Fitting the workflow management facility into the object management architecture. Business Object Design and Implementation II. Springer London, 1998, pp. 109-117.
Surjanto, B., XML content management based on object-relational database technology. Proceedings of the First International Conference on Web Information Systems Engineering, IEEE, 2000, Jun. 19-21, 2000, vol. 1, pp. 70-79.
[No Author Listed] About the Integrated Work Manager (IWM). Pegasystems, Inc., Apr. 30, 2009, 3 pages, http://pdn-dev/DevNet/PRPCv5/KB/TMP9ad0lzumf.asp.
[No Author Listed] FreeBSD Project. "EDQUOTA(8)" in Free BSD System Managers Manual. FreeBSD 8.2 Jun. 6, 1993. pp. 1-2. Retrieved from freebsd.org on Oct. 27, 2011.
[No Author Listed] How SmartForms for Fair Blaze Advisor works,Fair Issac White Paper, http://www.FAIRISAAC.COM/, Oct. 31, 2005, 8 pages (website no longer active).
[No Author Listed] How to Configure and Customize the Universal Worklist. SAP Netweaver 04 and SAP Enterprise Portal 6.0. SAP AG. Version 1, May 2004, 65 pages. http://www.erpgenie.com/sap/netweaver/ep/Configuring%20the%20UWL.pdf.
[No Author Listed] How to configure the IWM/IAC gateway. Pegasystems, Inc., Apr. 30, 2009, 4 paegs, http://pdn-dev/DevNet/PRPCv5/KB/TMP9cf8fzurq4.asp.
[No Author Listed] How to install the Integrated Work Manager (IWM). Pegasystems, Inc., Apr. 30, 2009, 6 pages, http://pdn-dev/Dev N et/PRPCv5/KB/TMP9br 1 ezurp8 .asp.
[No Author Listed] HP Integrated Lights-Out 2, User Guide, Part No. 394326-004, HP, Aug. 2006, 189 pages.
[No Author Listed] Integrating with External Systems, PegaRULES Process Commander 5.2. Process Commander 5.2 reference. Pegasystems Inc, Cambridge, MA, 2006, 103 pages http:/ /pdn. pega.corn/ProductSupport/Products/PegaRULESProcessCommander/documents/PRPCN5/502/iwes/PRPC52_integrating_with_Extemal_Systems.pdf.
[No Author Listed] IP Prior Art Database, Options when returning work items in workflow management systems. IBM, IPCOM000027980D, 2004, 3 pages.
[No Author Listed] IP Prior Art Database, Staff Queries and Assignments in Workflow Systems. IBM, IPCOM000142382D, 2006, 4 pages.
[No Author Listed] IP Prior Art Database, Using work items to manage user interactions with adaptive business services. IBM TDB, IPCOM000015953D, 2003, 4 pages.
[No Author Listed] Localizing an Application, PegaRULES Process Commander. Process Commander 4.2 reference. Pegasystems Inc., Cambdrige, MA, 2006, 92 pages http://pdn.pega.com/DevNet/PRPCv4/TechnologyPapers/documents/Localization0402.pdf.
[No Author Listed] Oracle Universal Work Queue: Implementation Guide. Release IIi for Windows NT. Oracle Corporation. Jul. 2001, 136 pages. http://docs.oracle.com/cd/A85964_01/acrobat/eul 15ug.pdf.
[No Author Listed] Solaris 9 resource manager software. A technical white paper. Sun Microsystems, Inc., Palo Alto CA, 2002, 37 pages. XP-002291080. Retrieved Aug. 3, 2004 from http://wwws.sun.corn/software/whitepapers/solaris9/srm.pdf.
Bertino, E., and P. Foscoli, Index Organizations for Object-Oriented Database Systems, IEEE Trans. on Knowledge and Data Engineering, 7(2): 193-209 (Apr. 1995).
Bierbaum, A., et al., VR juggler: A virtual platform for virtual reality application development. Proceedings of the Virtual Reality 2001 Conference, IEEE, 2001, 8 pages, http://ieeexplore.ieee.org/stamp/stamp.j sptp=Stamumber-913 77 4.
Breiman, L., Bagging predictors, Machine Learning, vol. 24, No. 2, Aug. 31, 1996, pp. 123-140, Kluwer Academic Publishers, Netherlands.
Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext98. pp. 1-2.
Burleson, D., Adding behaviors to relational databases, DBMS, 8(10): 68(5) (Sep. 1995).
Busse, Ralph et al., Declarative and Procedural Object Oriented Views, IEEE, 1998, pp. 570-578, retrieved Mar. 22, 2007.
Buyya et al., Economic Models for Resource Management and Scheduling in Grid Computing, Concurrency and Computation: Practice and Experience, 2002, vol. 14, pp. 1507-1542. Chan, T.W., and W. Hwang, Towards Integrating Logic, Object, Frame, and Production, Proc. Fourth Int. Conf. on Software Engineering and Knowledge Engineering, IEEE, pp. 463-469, Jun. 1992.
Cheng, Cheng-Chung; Smith, Stephen F.; A Constraint Satisfaction Approach to Makespan Scheduling, ATPS 1996 Proceedings, pp. 45-52 (1996).
Cheng, C.C. and Smith, Applying Constraint Satisfaction Techniques to Job Shop Scheduling, Annals of Operations Research, 70: 327-357 (1997).
Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.
Damerau, F.J., Problems and some solutions in customization of natural language database front ends. ACM Transactions on Information Systems, vol. 3, No. 2, Apr. 1, 1985, pp. 165-184.
Danforth, S., Integrating Object and Relational Technologies, Proc. Sixteenth Annual Int. Computer Software and Applications Conf., IEEE Comput. Soc. Press, pp. 225-226, Sep. 1992 (Abstract).
Deelman, E., et al., Pegasus: A framework for mapping complex scientific workflows onto distributed systems, submitted to Scientific Programming, Jan. 2005. Pre journal publication article, 22 pages.
Deelman, E., et al., Pegasus: A framework for mapping complex scientific workflows onto distributed systems. Scientific Programming, 13, pp. 219-237, 2005.
Europoean Search Report for Application No. 19191686.5-1224/3611616, dated Jan. 22, 2020 (8 pages).

* cited by examiner

SOFTWARE CODE OPTIMIZER AND METHOD

This application claims the benefit of priority of U.S. Patent Application Ser. No. 62/718,809, filed Aug. 14, 2018, entitled Software Code Optimizer, the teachings of which are incorporated by reference herein.

BACKGROUND OF THE INVENTION

The invention pertains to digital data processing and more particularly, by way of non-limiting example, to the optimization of software. The invention has application in facilitating the download and execution of so-called web apps, as well as other computer programs that download and execute in source code format.

Enterprises are increasingly turning to web apps to service customer and other end user needs. This is an opportunity made possible by the ubiquity of feature-rich browsers supporting JavaScript, CSS and other user interface (UI) standards on mobile and other devices in the hands and/or on the desktops of billions of users worldwide. Whereas software distribution was once the sole province of high-tech companies with teams of dedicated developers, these feature-rich browsers now define such a large and powerful platform that enterprises of all varieties, from high-tech to low-tech, can benefit by distributing apps to them, whether for customer service, marketing or otherwise. Browser technologies have become so versatile in fact, that enterprises often rely on them for distribution of apps within the enterprise to employees—not just to customers and others on the outside.

Unfortunately, just like conventional software applications, browser apps often include code to support capabilities that most individual users do not require or cannot use. For example, browser apps typically include software supporting end users of diverse classes, even though each individual user who runs the app only falls into only one of those classes. Likewise, the apps provide code supporting user access from a variety of portals (e.g., developer portal, support portal, etc.) even though each end user is likely to access the app from only one of them.

A consequence of excess code is that web apps are large, and their downloads are slow. While end users who run a given app for hours on end may not be bothered by this on an initial download, occasional users will be—as are those who download "once and done" apps, e.g., customer service requests.

An object of the invention is to provide improved methods and apparatus for digital data processing.

A further object is to provide such methods and apparatus is to improve the download and execution of web apps and other computer programs that download and execute in source code format.

SUMMARY OF THE INVENTION

The above objects are among those attained by the invention which provides, in some aspects, methods of optimizing an app for download to and/or execution on a client device by identifying components of the app used in such execution by a user having a designated role who accesses the app for download via a designated portal. A component can be, for example, a source code file or portion thereof, including, for example, a portion defining a widget or other user interface element.

For each component, the method (i) identifies source code files on which execution of that component depends, e.g., in connection with execution of the particular app by the particular user, and (ii) generates a dependency-ordered stack of the source code files for that component. In further accord with those aspects of the invention, the method combines the dependency-ordered stacks into a single such stack and transfers the source code in an order specified by that stack to the client device for loading and execution.

Related aspects of the invention provide optimization methods, e.g., as described above, where the step of identifying source code file dependencies and generating a dependency-ordered stack for each component includes (i) recursively iterating, in both depth and breadth, through the identified components and, in turn, through the components on which they depend, and (ii) creating a dependency stack for each component encountered during such recursive iteration if none exists.

Further related aspects of the invention provide optimization methods, e.g., as described above, where a sort (e.g., a bubble sort or otherwise) is used to combine the dependency-ordered stacks into a single dependency-ordered stack.

Yet further related aspects of the invention provide optimization methods, e.g., as described above, where combining the dependency-ordered stacks includes iteratively appending one of the dependency-ordered stacks to an intermediate stack and deleting prior entries in that intermediate stack.

Still yet other related aspects of the invention provide optimization methods, e.g., as described above, where transferring the source code to the client device includes doing so in multiple bundles, each based on the dependency order specified in the single dependency-ordered stack. Those bundles can include, according to other related aspects of the invention, a top bundle including source code that is loaded as soon as a page is visible upon execution of the app on the client digital data device; a template bundle include source code loaded before control rendering begins upon execution of the app on the client digital data device; and a bottom bundle including source code loaded at an end of an initial page load upon execution of the app on the client digital data device.

Yet still other aspects of the invention provide optimization methods, e.g., as described above, where the step of identifying components used in execution of the app includes crawling the app source code starting at an entry point and recursively descending in both depth and breadth, crawling designated components even if they will not be used in execution of the app on the client digital data device by the user, and not crawling designated components even if they will be used in execution of the app on the client digital data device by the user.

Still further related aspects of the invention provide methods, e.g., as described above, where source code files defining components are JavaScript files.

Other aspects of the invention provide methods, e.g., as described above, that include identifying, in style sheets, a set of user interface components, features of those components, and formats of those components or features, used in execution of an app on a client digital data devices by users having a plurality of different respective roles and/or portals from which they request transfer of the app for loading and execution. The method further includes identifying a subset of those components, features and formats not used in execution of the app on a client digital data device by a user having at least one of a designated role and a designated portal from which the client digital data device requests transfer of the app for loading and execution.

The method calls for transferring to the client digital data device for loading and execution thereon those style sheets files or portions thereof that define components, features and formats that are in the set, while refraining from transferring those that define components, features and formats that are in the subset. Thus, for example, if a first subset of components, features and formats are identified as not used on a first client digital data device by a first user having a first role who downloads the app from a first portal, and a second subset of components, features and formats are identified as not used on a second client digital data device by a second user having a second role who downloads the app from a second portal, the method calls for transferring to the first client digital data device for loading and execution source code files that define the set while foregoing transfer those at define the first subset and transferring to the second client digital data device for loading and execution source code files that define the set while foregoing transfer those at define the second subset.

Related aspects of the invention provide methods, e.g., as described above, that include generating and transferring to the client digital data device for loading and execution source code files that define the set but that are not in the subset, while foregoing at least one of generating and transferring those source code files that define the subset.

Still further related aspects of the invention provide methods, e.g., as described above, where source code files defining formats of the user interface components are cascading style sheets (CSS).

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
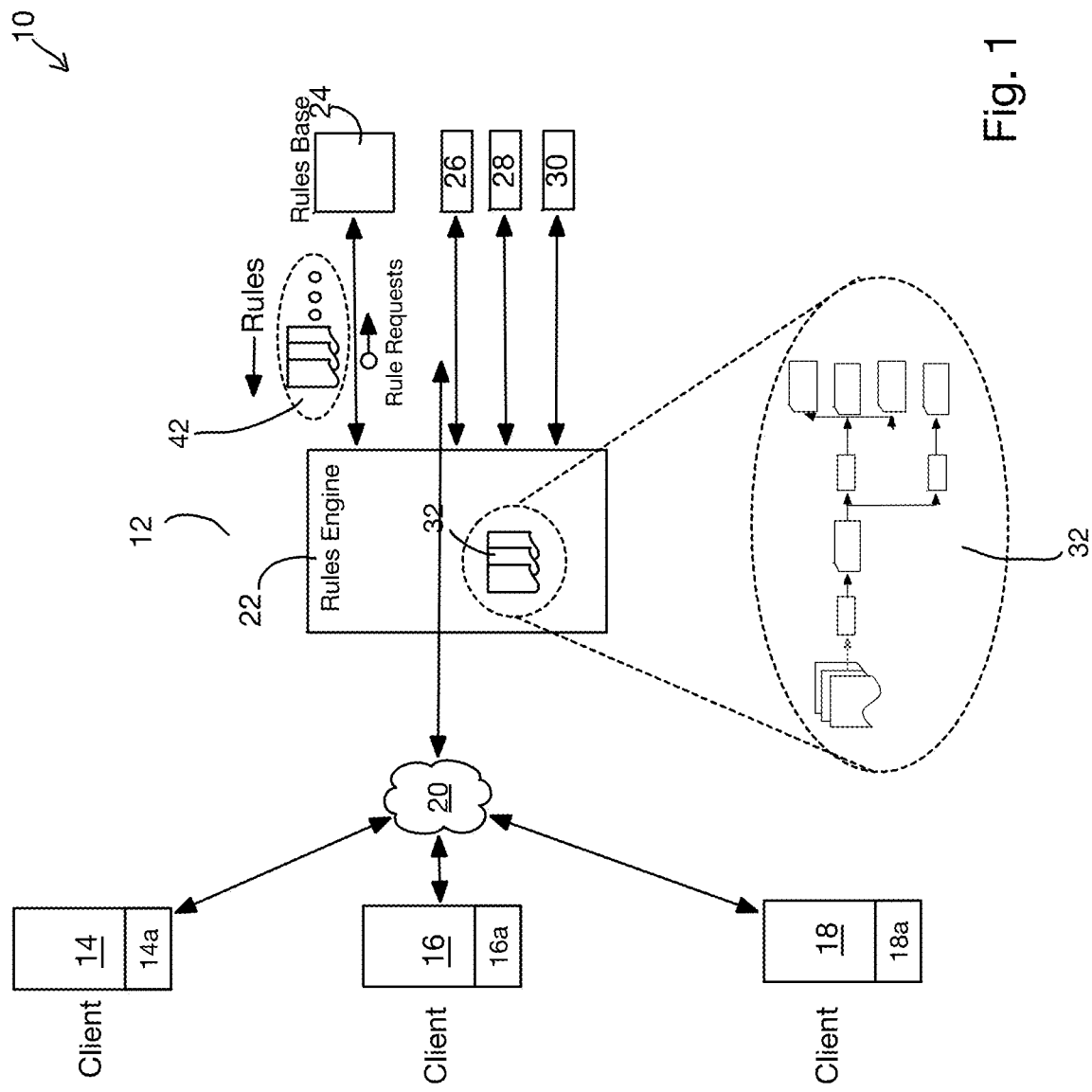
FIG. 1 depicts a digital data processing system for practice of the invention, as well as a system in which the invention may be practiced.

FIG. 1 depicts a digital data processing system 10 for practice of the invention, as well as a system 10 in which the invention may be practiced. The system 10 includes a server digital data processor 12 that is coupled to client digital data processors 14, 16 and 18 via a network 20 comprising a combination of one or more of the Internet, a wide area network (WAN), metropolitan area network (MAN), local area network (LAN), telephone networks and/or a combination of these and other networks (wired, wireless, public, private or otherwise).

The illustrated client digital data processors 14-18 are conventional tablet computers, PDAs, mobile phones or other digital data apparatus (including, for example, desktop computers, workstations, minicomputers, and laptop computers) of the type that are commercially available in the marketplace and that are suitable for operation in the illustrated system as described herein and all as adapted in accord with the teachings hereof.

The digital data devices 14-18 each comprise central processing, memory, storage and input/output units and other constituent components (not shown) of the type conventional in the art that cooperate to execute applications 14a-18a, each of which comprises a web application of the type commercially available in the marketplace or otherwise known in the art and operative on the respective devices 14-18 for, by way of example, for purposes of presenting user interfaces on the respective devices 14-18, presenting data in connection therewith received from the server 12, user or otherwise, accepting user input with respect to those interfaces, issuing HTTP/HTTPS (collectively, "HTTP") requests to the server 12 for those interfaces and/or for requesting and/or submitting information with respect thereto, and so forth, all as per convention in the art as adapted in accord with the teachings hereof. Those web apps can comprise HTML, JavaScript, cascading style sheets (CSS), and so forth, and they can execute within the context of a web browser (not shown), a WebKit, or otherwise—again, per convention in the art as adapted in accord with the teachings hereof.

The central processing, memory, storage and input/output units of client digital data processors 14-18 may be configured to form and/or may be supplemented by other elements of the type known in the art desirable or necessary to support applications 14a-18a, respectively, in accord with the teachings hereof, as well as to support other operations of the digital data processor 12. These can include, by way of non-limiting example, peripheral devices (such as keyboards and monitors), operating systems, and network interface cards and software, e.g., for supporting communications with server digital data processor 12 and other devices over network 20.

Although client digital data processors 14-18 are depicted and described in like manner here, it will be appreciated that this is for sake of generality and convenience: in other embodiments, these devices may differ in architecture and operation from that shown and described here and/or from each other, all consistent with the teachings hereof.

Like client digital data processors 14-18, server digital data processor 12 is a digital data processing apparatus of the type commercially available in the marketplace suitable for operation in the illustrated system as described herein, as adapted in accord with the teachings hereof. Though the server 12 is typically implemented in a server-class computer, such as a minicomputer, it may also be implemented in a desktop computer, workstation, laptop computer, tablet computer, PDA or other suitable apparatus (again, as adapted in accord with the teachings hereof).

Server digital data processor 12, too, comprises central processing, memory, storage and input/output units and other constituent components (not shown) of the type conventional in the art that are configured in accord with the teachings hereof to form rules engine 22 and rules base 24, transaction database 26, language database 28 and context registry 30, one or more of which may be absent in various embodiments of the invention.

Although only a single server digital data processor 12 is depicted and described here, it will be appreciated that other embodiments may have greater or fewer numbers of these devices.

Those other servers may differ in architecture and operation from that shown and described here and/or from each other, all consistent with the teachings hereof. Still further, although server 12 of the illustrated embodiment is depicted as being remotely disposed from the client digital data processors 14-18, in other embodiments, one or more of the client devices may be co-housed with the server.

Rules base 24 comprises a conventional rules base of the type known in the art (albeit configured in accord with the teachings hereof) for storing digitally encoded rules 25 and other application-related information in tables, database records, database objects, and so forth. Such stored rules 25 are likewise formatted and stored in the conventional manner known in the art (albeit configured in accord with the teachings hereof). Here, rules base 24 is configured and contains rules for use in business process management applications, though in other embodiments it may be configured and used for other applications. Such a rules base can be of the type described in the US patents and patent applications assigned to the assignee hereof, e.g., U.S. Pat. Nos. 5,826,250, 6,976,144, 7,665,063, 8,335,704, 7,711, 919, 7,640,222, 8,250,525, US 20080208785, US 20090132232, U.S. Pat. Nos. 8,843,435, 8,479,157, 8,468, 492, 8,880,487, 8,924,335, 9,189,361, US 20130231970, U.S. Pat. Nos. 9,678,719, 8,959,480, 9,270,743, US 20150127736, U.S. Pat. No. 9,658,735, US 20160098298, US 20170090685, US 20170255341, the teachings of which are incorporated by reference herein; though, a rules base that is architected and/or operated differently may be used as well or in addition, as may be another store and/or repository of applications, apps and other software suitable for use in connection herewith.

Although shown in the illustrated embodiment as part of server 12, rules base 24 (or other repository) may reside elsewhere, e.g., remote to server 12. Moreover, some embodiments may utilize multiple rules bases, e.g., an enterprise-wide rules base 24 on the server 12 and domain-specific rules bases on one or more of client devices 14-18, all by way of example. To the extent that multiple rules bases are provided in any given embodiment, they may be of like architecture and operation as one another; though, they may be disparate in these regards, as well. Utilization of multiple rules bases may be accomplished in the manner described in one or more of the above-cited incorporated-by-reference U.S. patents and patent applications, e.g., U.S. Pat. No. 8,924,335, entitled "Systems and Methods for Distributed Rules Processing," the teachings of which are incorporated heron by reference.

Transactional database 26 comprises a conventional database of the type known in the art (albeit configured in accord with the teachings hereof) for storing corporate, personal, governmental or other data that may be any of generated, stored, retrieved and otherwise processed (hereinafter, collectively referred to as "processed") by rules in rules base 24 and/or rules stored/executed elsewhere. The data may be financial data, customer records, personal data, run-time data related to an application, or other type of data and it may be stored in tables, database records, database objects, and so forth.

As above, some embodiments may utilize multiple transactional databases, e.g., an enterprise-wide database 26 on the server 12 and branch-office specific databases on the client devices 14-18, all by way of example. To the extent that multiple transactional databases are provided in any given embodiment, they may be of like architecture and operation as one another; though, may they be disparate in these regards, as well. Utilization of multiple transactional databases may be accomplished in the manner described in incorporated-by-reference U.S. Pat. No. 8,924,335.

Language base 28 encodes information regarding the syntax of the language (or languages) in which user interfaces generated by server 12 are presented on devices 14-18 and, more particularly, in the illustrated embodiment, by applications 14a-18a. That syntax can include one or more of grammar, spelling, usage, punctuation, and/or style. The language base 28 may comprise a language database of the variety commercially available in the marketplace—e.g., in the manner of spelling and grammar dictionaries provided with conventional word processors (which "dictionaries" often include usage-, punctuation- and/or style-related entries). Alternatively, the language syntax information may be embodied in one or more rules 25 of the rules base 24, or otherwise.

Context registry 30 is a store that includes information related to the respective contexts or circumstances in which the requested user interfaces (e.g., web pages) are and/or will be communicated to and executed on the respective client devices 14-18. That context or circumstance can include, by way of non-limiting example, user "properties" or business attributes (e.g., access requirements, disability settings, market segment, behavioral segment, age, locale, and so forth), client device 14-18 properties (e.g., processor speed, display size, keyboard capabilities, locale, and so forth), communication channel properties (e.g., the speed and type of connection between server 12 and the respective client devices 14-18) and portal properties (e.g., download file size limits, quality-of-service requirements and so forth). That context or circumstance can further include, by way of non-limiting example, the language, country and/or other locale settings and preferences of the user of a device on which the web page is to be displayed. Still other variations in the possible range of values stored in the context registry 30 are possible.

Illustrated digital data processor 12 also includes rules engine 22 of the type conventionally known in the art (albeit configured in accord with the teachings hereof) for use in processing rules from a rules base in order to process data, e.g., in (and/or for storage to) a transactional database in view of a language base and/or context registry or other data sources described above, for example, in connection with events signaled to and/or detected by the engine. In the illustrated embodiment, the rules engine is of the type used for business process management applications, though in other embodiments it may be of the type used for other applications. Preferred such rules engines are of the type described in the aforementioned incorporated-by-reference U.S. Pat. No. 5,826,250, entitled "Rules Bases and Methods of Access Thereof" and U.S. Pat. No. 7,640,222, entitled "Rules Base Systems and Methods with Circumstance Translation" and/or U.S. Pat. No. 8,250,525, entitled "Proactive Performance Management For Multi-User Enterprise Software Systems," the teachings too of which are incorporated by reference herein-all as adapted in accord with the teachings hereof.

The rules engine 22 may be implemented in a single software program or module, or a combination of multiple software modules/programs. Moreover, it may comprise programming instructions, scripts, rules (e.g., rules stored in rules base 24) and/or a combination of thereof. And, even though the rules engine 22 of the illustrated embodiment is depicted as executing on just server digital data processor 12, in other embodiments, the engine may execute on or across multiple digital data processors (e.g., 12, 14, 16 and 18). Executing the engine 22 over multiple digital data processors may be accomplished in the manner described in incorporated-by-reference U.S. Pat. No. 8,924,335, by way of non-limiting example.

Described below is a method of operating system 10 and, particularly, server 12 and still more particularly, by way of example, rules engine 22, to optimize instantiations of a model app 42 for download from that device 12, rules base 24 and/or engine 22 to one or more client devices 14-18 for execution thereon, e.g., as a web app 14a-18a. This may be, for example, at the request of a user of one of those devices issued via a web browser executing thereon or otherwise; conversely, such download may be effected sans user request, e.g., upon boot-up of a respective one of the devices 14-18 or otherwise—all as per convention in the art as adapted in accord with the teachings hereof.

As used here, to "optimize" the app 42 means to reduce the footprint of JavaScript code and/or cascading style sheets (CSS) that make up the app 42 as downloaded vis-à-vis instantiations thereof to the requesting device 14-18, e.g., based on the nature of that device, the access requirements (i.e., "role") of the user of that device making the request and/or on behalf of whom the request is made, and the portal (i.e., the web site or web address) to the which download request was made and/or from which the request is fulfilled. The app 42 is occasionally referred to herein as an app "model" because it includes rules and style sheets for all combinations of portals, requesting devices and user roles.

In the illustrated embodiment, that method is carried out by an optimization application 32 alone and/or in cooperation with other functionality of the server 12 and/or client devices 14-18, as evident in the discussion below. Application 32 of the illustrated embodiment is implemented in rules that are stored in rules base 24 and executed by rules engine 22 upon invocation. However, other embodiments may vary in this regard. Thus, for example, application 32 may be embodied in other software formats, sourced from other repositories and executed other than on a rules engine.

Likewise, in the illustrated embodiment, model apps which are instantiated for download to requesting devices 14-18 (e.g., model app 42 mentioned above and discussed below) are sourced from rules base 24. In such an embodiment, the app 42 is represented by a set of rules (e.g., from the rules base 24) that combine to define the app's functions and features when executed, e.g., as an app 14a-18a within a browser or otherwise the requesting device. In other embodiments, the app 42 may be represented in other software formats and executed according within browsers or otherwise on the respective devices 14-18.

Optimization Application

Figure 2:
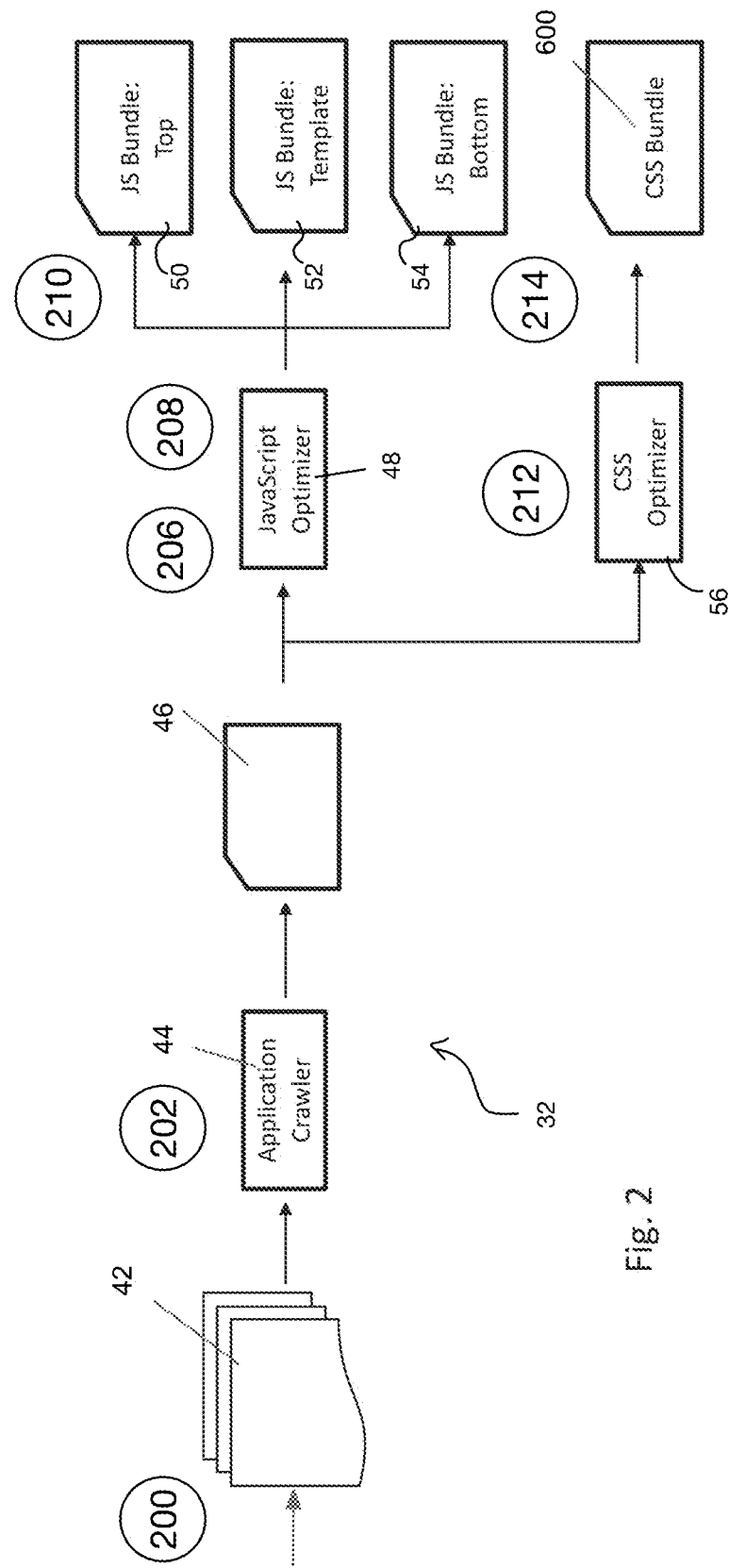
FIG. 2 depicts operation of an optimization application in a system according to one practice of the invention.

Referring to FIG. 2, in step 200, the optimization application 32 is invoked in real-time mode or batch mode by rules engine 22 or other functionality executing on server 12. Real-time mode refers to invocation in real-time response to a request by a client device 14-18 for download of an instantiation of app 42 to be executed on that device. Batch mode refers to invocation of the application 32 in advance of such a request—e.g., as where the application 32 is invoked to generate instantiations of the app 42 that are expected to meet possible future such requests. Invocation of the application 32, whether implemented in rules or otherwise in real-time mode or in batch mode, is within the ken of those skilled in the art in view of the teachings hereof.

In step 202, an application crawler 44 that forms part of optimization application 32 parses and/or otherwise crawls the source code of app 42, that is, the rules or other source code instructions (hereinafter, collectively, "source code rules" or, simply, "rules") comprising app 42 to identify source code files or portions thereof, including user interface components—all, collectively, referred to herein as "components"—for use with an instantiation of app 42 (i) for download from a designated portal, (ii) for execution on a designated (requesting) device 14-18, and/or (iii) by a user having a designated role or, put another way, for use with an instantiation of app 42 for download and execution in connection with a specific combination of portal, device and/or user role. In the illustrated embodiment, the source code 42 is JavaScript and related programming instructions/declarations, e.g., embedded scripting languages, style sheets, and the like, all as within the ken of those skilled in the art in view of the teachings hereof. In other embodiments, the source code files may include other source code programming languages, instead or in addition.

The crawler 44 generates, in step 202, a report 46 referred to in the drawings as a "crawler usage report"; although, it need not be a report in the conventional sense of a human-readable document but, rather, may comprise any memorialization of identified components, e.g., in binary, XML, or otherwise, as is within the ken of skilled in the art in view of the teachings hereof. The report can be stored in a dedicated file, as part of a database or otherwise, on server 12 or otherwise. Operation of the crawler 44 may be further appreciated in connection with FIG. 3 and the discussion thereof below.

In addition to the foregoing, the crawler usage report 46 is supplemented to include, for each listed component, names or identities of one or more JavaScript ("JS") files that implement (i.e., contain code defining) the component—or, put another way, the JS files on which the component depends. In addition, the report 46 can identify user interface features implemented by those files—or, put another way, the JS files on which those features depend. The crawler usage report 46 can, moreover, be supplemented to indicate when each JS file is preferably loaded. For example, such load order can be designated as "top," "template" or "bottom" bundle (as described further below).

The foregoing component-to-file and feature-to-file dependencies and bundle designations can be added to the report 46 automatically by the application crawler 44 and/or with the assistance of an administrator, software engineer or other human agent. Alternatively, or in addition, the crawler 44 can rely on a file or other listing of such dependencies and/or load order for purposes of supplementing the report 46.

As used above and elsewhere herein, a portal designation can be with respect to a specific portal address (or portion of such address) from which the instantiation is to be downloaded (or, as used synonymously therewith herein, to which a request for download is made), or with respect to a role served by such portal (e.g., a portal that serves production code vs test code, etc.), and so forth, as is within the ken of those skilled in the art in view of the teachings hereof. Likewise, above and elsewhere a device designation can be with respect to a specific device address (e.g., as specified by MAC address, or other unique identifier) or device type (e.g., as specified by operating system, browser or webkit type, processor class, memory or other storage capacity, display type/size, data communication speed and type, and so forth), or otherwise, as is within the ken of those skilled in the art in view of the teachings hereof. Furthermore, above and elsewhere a user role designation can be with respect to a specific role, e.g., end user, developer, administrator and so forth, as reflected in an active directory, user name requirement codes or otherwise, as is within the ken of those skilled in the art in view of the teachings hereof. In some embodiments, the user role designation/identification can extend to a level of granularity of individual users in which case the designation/identification can be by user name, ID or other unique identifier.

In step 206, a JavaScript optimizer 48 that forms part of optimization application 32 generates for the components identified in Step 202 and reflected in the report 46 (i.e., the components identified as being for use with an instantiation of app 42 for download and execution in connection with a specific combination of portal, device and/or user role) a dependency-ordered stack of source code files containing the components so identified. In step 208, the JavaScript optimizer combines the dependency-ordered stacks generated in step 206 into a single dependency-ordered stack. In step 210, the JavaScript optimizer 48 prepares for transfer to and loading on a requesting client device 14-18 (and, particularly, for example, within the environment of a browser or webkit of such device) the source code files identified in the dependency-ordered stack generated in step 208. The optimizer 48 prepares for such transfer in an order that is based on the dependency order specified in that stack. In embodiments, in which the steps 200-210 are executed in real-time mode, the optimizer 48 can, alone or in cooperation with other elements of server 12, proceed with transfer of those files in that order, via HTML stream or otherwise, as is within the ken of those skilled in the art in view of the teachings hereof. Where, on the other hand, steps 200-210 are executed in batch mode the optimizer can delay such transfer until such a corresponding request is received. Operation of the optimizer 48 as per steps 206-210 may be further appreciated in connection with FIG. 7 and the discussion thereof below.

In some embodiments, the optimizer 48 transfers (or prepares for transfer) the source code files to the requesting client 14-18 in multiple bundles, including (i) a top bundle 50 comprising source code loaded as soon as page is visible upon execution of the app on the client digital data device by the user, (ii) a template bundle 52 comprising source code loaded before control rendering begins upon execution of the app on the client digital data device by the user, and (iii) a bottom bundle 54 comprising source code loaded at an end of an initial page load upon execution of the app on the client digital data device by the user. In each instance, the bundles are transferred in accord with the dependency order specified in the single dependency-ordered stack. In other embodiments, the JavaScript optimizer 48 may transfer the source code files in greater, fewer and/or different bundles. The segregation of files into such bundles and their transfer to the client devices 14-18 is within the ken of those skilled in the art in view of the teachings hereof.

As discussed above, in step 202, the application crawler 44 can parse/crawl rules comprising app 42 to identify components for use with an instantiation of app 42 for download and execution in connection with a specific combination of portal, device and/or user role. In step 202 of some embodiments, the crawler 42 can, alternatively or in addition, identify the cascading style sheets (hereinafter, simply, "style sheets") used by the app 42, a set of user interface components, features of those user interface components, and formats of those user interface components or features—all, collectively, referred to herein as a set of "style features"—for use with instantiations of app 42 downloaded from a plurality of different portals for execution on a plurality of different (requesting) devices 14-18, and/or by a plurality of users having different role. The crawler can, furthermore, identify a subset of those style features that are not for use with an instantiation of app 42 (i) for download from a designated portal, (ii) for execution of a designated (requesting) device 14-18, and/or (iii) by a user having a designated role or, put another way, that are not for use with an instantiation of app 42 for download and execution in connection with a specific combination of portal, device and/or user role. In embodiments where step 202 includes identifying style features, step 202 can include generating the report 46 to include such style features as fall within the aforesaid set, along with those that fall in the aforesaid subset.

Moreover, in such embodiments, a CSS optimizer 56 that forms part of optimization application 32 can, in step 212, prepare for transfer to and loading and execution on the client device 14-18 (and, particularly, for example, the browser of such a device) files that define style sheets that are in the aforesaid set but that are not in the aforesaid subset. In embodiments in which the steps 200-202 and 212 are executed in real-time mode, the optimizer 56 can, alone or in cooperation with other elements of server 12, proceed with the file transfer via HTML stream or otherwise, as is within the ken of those skilled in the art in view of the teachings hereof. Where, on the other hand, those steps are executed in batch mode the optimizer can delay such transfer until such a corresponding request is received.

Operation of the CSS optimizer 56 may be further appreciated in connection with FIGS. 4-5 and the discussion thereof below.

Application Crawler

Figure 3:
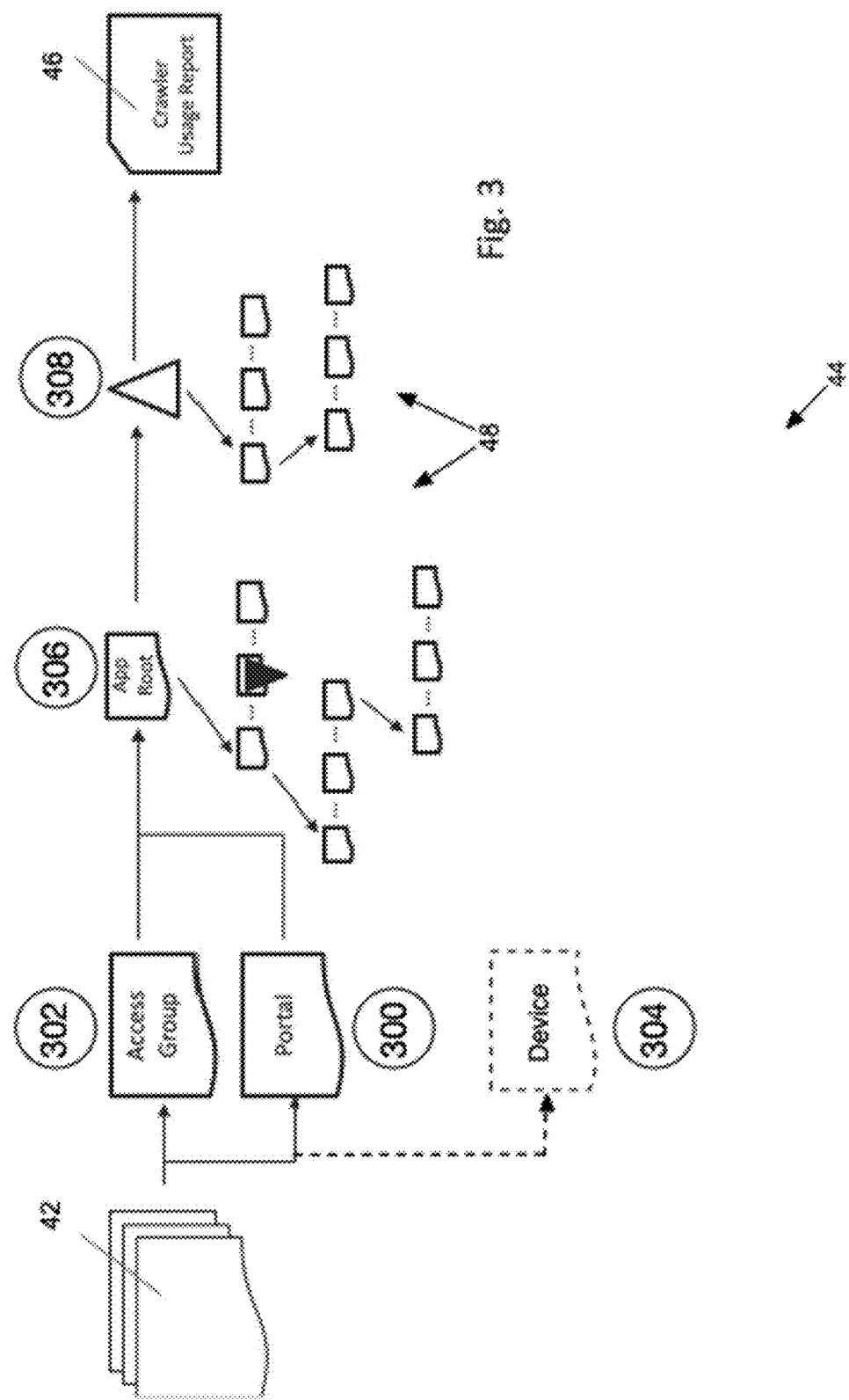
FIG. 3 depicts operation of a crawler in a system according to one practice of the invention.

FIG. 3 depicts operation of an application crawler 44 according to one practice of the invention. As noted above, the crawler parses/crawls a set of rules defining an app model 42 to identify components used in execution of an instantiation of that model for a specific combination of portal, device and/or user role.

In step 300, the crawler 44 discerns the portal in connection with which the components of app 42 are to be identified. In real-time mode, the crawler 44 can determine the portal of a just-received request from the identity of a function or page from which it (the crawler 44) is invoked, from the identity of a server 12 upon which the crawler 44 is executing, or as otherwise within the ken of those skilled in the art in view of the teachings hereof. In batch mode, the portal associated with a possible future request can be passed as a parameter to the crawler 44, e.g., by the rules engine 22 or other functionality executing on server 12 that iterates through portal/device/user-role combinations for purposes of generating such instantiations in advance, or otherwise, as is within the ken of those skilled in the art in view of the teachings hereof.

In step 302, the crawler 44 discerns the user role (or "access group") in connection with which the components of app 42 are to be identified. In real-time mode, the crawler 44 can determine the role/access group of a user from a cookie maintained on that user's device, from a parameter passed by a function or page from which the crawler 44 is invoked, or as otherwise within the ken of those skilled in the art in view of the teachings hereof. The crawler 44 can likewise determine the role/access group associated with at possible future request, i.e., in batch mode, from a parameter passed by the functionality that iterates through portal/device/user-role combinations, or otherwise, as is within the ken of those skilled in the art in view of the teachings hereof.

In step 304, the crawler 44 discerns the device in connection with which the components of app 42 are to be identified. In real-time mode, the crawler 44 can determine the role/access group of a user by querying the browser, webkit or other functionality executing on the user device 14-18 from which the download request was initiated, from a parameter passed by a function or page from which the crawler 44 is invoked, or as otherwise within the ken of those skilled in the art in view of the teachings hereof. The crawler 44 can likewise determine the device associated with at possible future request, i.e., in batch mode, from a parameter passed by the functionality that iterates through portal/device/user-role combinations, or otherwise, as is within the ken of those skilled in the art in view of the teachings hereof.

Although FIG. 3 illustrates determination by crawler 44 of each of the portal, user role and device for purposes of identifying components used in execution of an instantiation of app model 42, other embodiments may use only one or two of those determinants—e.g., user role and portal, by way of non-limiting example—and, hence, in the discussion that follows they are connected by the grammatical conjunction "and/or."

In step 306, the crawler 44 recursively iterates, in both depth and breadth, through rules contained in app model 42 beginning at the execution entry point for the specified combination of portal, device and/or user role. In the illustrated embodiment, the crawler 44 iterates through the rules on a file-by-file basis, as reflected by the source code files depicted as elements 48 in the drawing. As used here, "entry point" (or "app root") refers to the programming instruction and, more generally, the component at which execution of the instantiated app will begin, upon user request or otherwise, following download. The identification of that entry point, as typically, based on requirements associated with one or more of the designated portal, user role and/or device, is within the ken of those skilled in the art in view of the teachings hereof.

Such recursive iteration can be effected by executing the following steps, beginning at the entry point: (i) iterating (or stepping) through each instruction (or "rule," as used herein synonymously therewith) of source code in a component and (ii) identifying each further component (if any) that instruction references which further component is available and suitable for execution in view of the designated combination of portal, user role and/or device—and, repeating those steps (i) and (ii), in turn (i.e., recursively), for each such referenced component. As each component available and suitable for execution in view of the designated combination of portal, user role and device is identified through this iterative recursion, the crawler 44 stores the component's name or other identification to report 46. Such instruction-by-instruction iteration can be effected through a line-by-line examination of the source code. Alternatively, it can be effected using information in a source code model that represents each source code file, e.g., with metadata that includes component dependencies (as defined by an administrator, software engineer, automated analysis or otherwise). A benefit of this latter approach is avoidance of line-by-line parsing of the source code concurrently with execution of optimization application 32.

In addition to identifying component dependencies during recursive iteration of the app model 42, the crawler 44 also identifies user interface features that depend on the examined source code files. For example, a source code file may be marked (in the aforesaid source code model) with metadata indicating that file is used for a button component that is formatted (i.e., displayed) as a text link. Another file may be marked by such metadata that indicates the same button component is formatted as an image. By storing those file-based UI feature dependencies, e.g., to report 46, the crawler 44 makes possible the building of bundles that avoid inclusion of unnecessary source code, as discussed further below.

In some embodiments, in step 306, the crawler 44 recursively iterates through all rules that are available and suitable for execution for the designated combination of portal, user role and/or device, as described above. In other embodiments, the crawler 44 skips (i.e., does not perform aforesaid steps (i) and (ii)) on components that are marked as "blacklisted", e.g., as indicated by the black triangle superimposed over one of the files 48 in the drawing. A listing of files to be skipped in this regard can be reflected in a store (not shown) associated with the crawler 44, the engine 32, the server 12 or otherwise, as per convention in the art as adapted in accord with the teachings hereof. Such components can be identified in such a store by file name, line range, rule name or id, and/or via other convention within the ken of those skilled in the art as adapted in accord with the teachings hereof. As a consequence, components on which blacklisted ones depend (e.g., components that are themselves specified within a blacklisted component and that, therefore, are necessary for the blacklisted component to execute) will not be identified as necessary for execution—unless those depended-upon components are crawled during processing of other, non-blacklisted components of the app 42.

Conversely, in other embodiments, the crawler 44 can, in step 308, recursively iterate through all rules that make up components that are "whitelisted," e.g., regardless of whether those components are available and suitable for execution in view of the designated combination of portal, user role and/or device. As above, such whitelisted components can be identified in such a store by file name, line range, rule name or id, and/or via other convention within the ken of those skilled in the art as adapted in accord with the teachings hereof.

Application crawler 44 stores to the usage report 46 a report of rules and, more generally, components used in execution of an instantiation of app model 42 for the specific combination of portal, device and/or user role. It can supplement that with dependencies and load-order pertaining to each component, as discussed above.

CSS Optimizer

Figure 4:
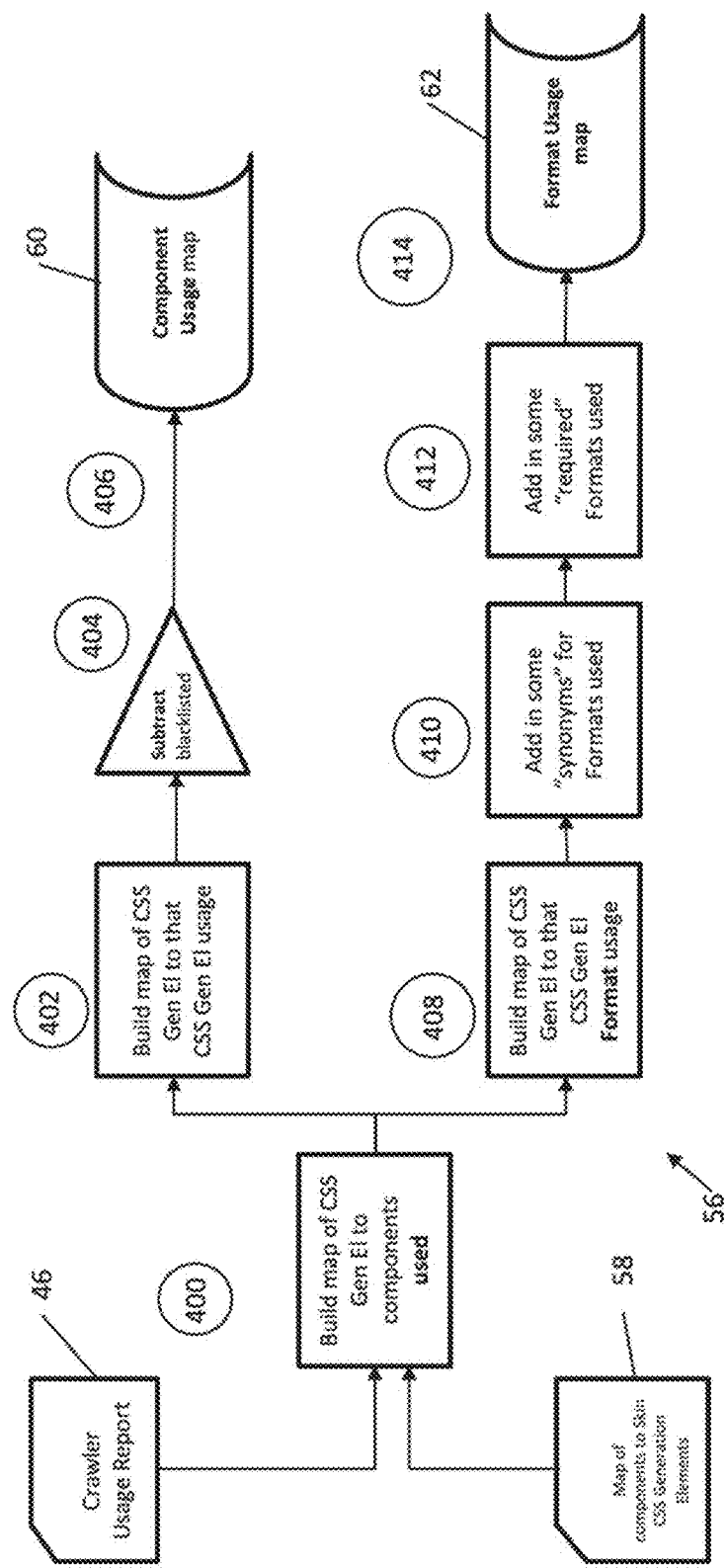
FIG. 4 depicts operation of the CSS optimizer in a system according to one practice of the invention.
Figure 5:
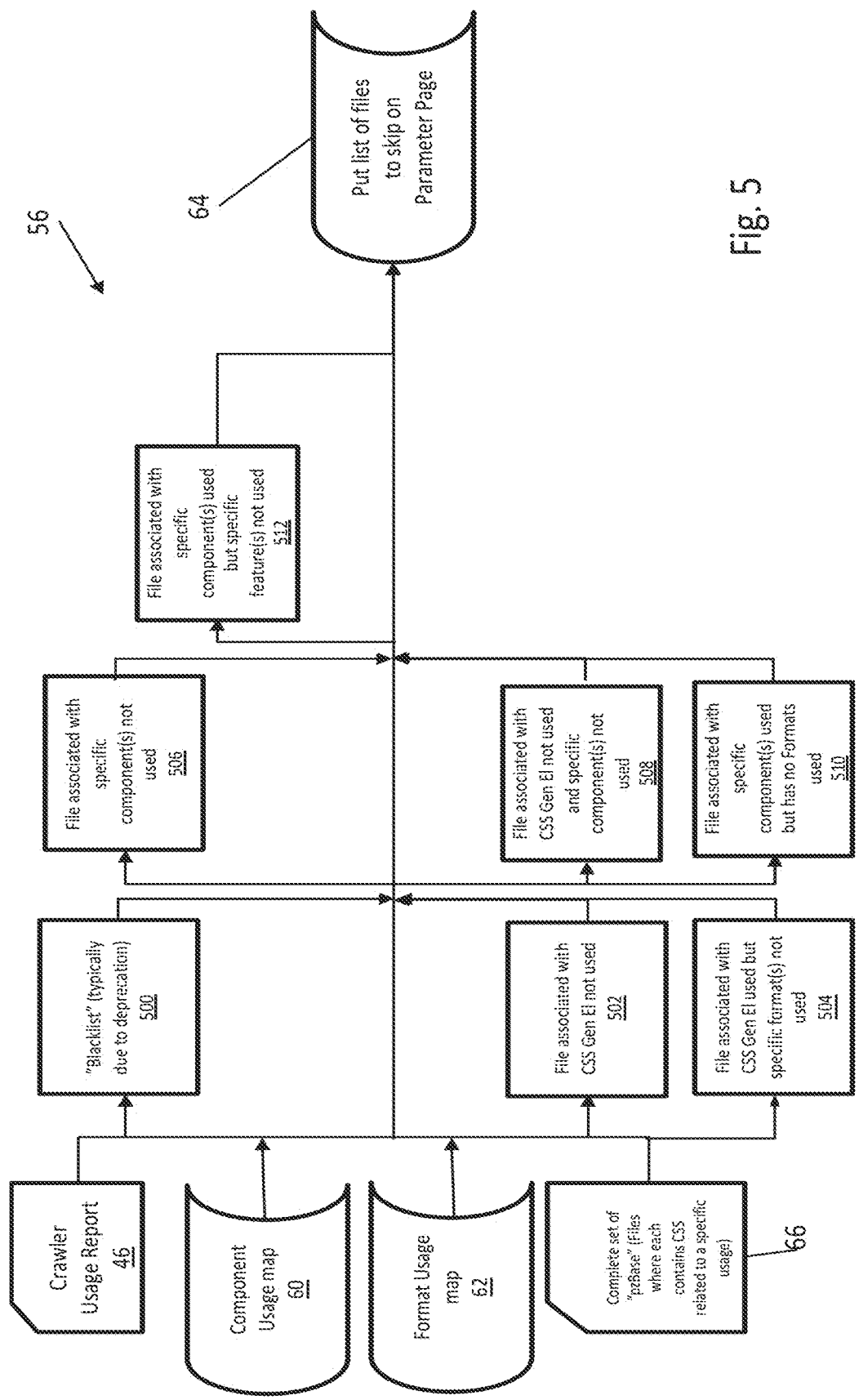
FIG. 5 depicts further aspects of operation of the CSS optimizer in a system according to one practice of the invention.

FIGS. 4-5 depict operation of the CSS optimizer 56 according to one practice of the invention in regard to building optimization representations from the usage report 46. FIG. 4 depicts the first part of that process resulting in identification of CSS generation elements required for an instantiation of model app 42 for a specific combination of portal, device and/or user role. FIG. 5 depicts the second part of that process, resulting in a listing of a subset of CSS style feature-related files not necessary for that particular instantiation, which subset is defined with respect to the set of all CSS style feature-related files used by the app 42 independent of portal, device and user role.

In step 400, the optimizer 56 maps (i) cascading style sheets (CSS) for buttons, check boxes and other user interface widgets (collectively, referred to here as "generation elements" or "Gen El") used in the model 42 as a whole to (ii) components identified as used in execution of an instantiation of the model 42 for a specific combination of portal, device and/or user role. The components are reflected in the crawler usage report 46, which is generated as discussed above in connection with FIGS. 2-3. The CSS for generation elements is reflected in a map 58, which is generated from an application rule 24 that describes the complete set of CSS Generated Elements and formats that may be used by an application model 42. In the illustrated embodiment, the mapping by the optimizer in step 400, that is, the mapping of CSS generation elements to components is 1 to m, where m is an integer greater than or equal to one.

The mapping of generation elements to components or other values, as reflected in step 400 and elsewhere herein, is within the ken of those skilled in the art in view of the teachings hereof. Such mappings can be reflected in tables, arrays, linked lists or otherwise, whether stored in binary, text or otherwise, as is within the ken of those skilled in the art in view of the teachings hereof.

In step 402, the optimizer 56 maps each CSS generation element used in the model 42 as a whole to a Boolean value (e.g., true or false) reflecting whether that element appears in the mapping generated in step 400. Put another way, the optimizer 56 in step 402 assigns each CSS Gen El used in model 42 as a whole a value of true or false, depending on whether that CSS Gen El is used in a component that appears in the usage report 46. In addition to assigning a value of false to each CSS Gen El not used in a component in that report 46, the optimizer assigns a value of false to each generation element that is blacklisted, e.g., as reflected in the store referred to above in connection with step 306 or otherwise. See step 404. By this mechanism, embodiments can prevent the download of CSS generation elements that have been deprecated.

Although Boolean values are mentioned above and elsewhere herein, it will be appreciated that other values may be used instead or in addition. Moreover, it will be appreciated that in lieu of mapping CSS Gen El to Boolean (or other) values, alternative techniques within the ken of those skilled in the art for reflecting the same information may be used instead or in addition.

In step 406, the optimizer 56 stores the resultant mapping of CSS generation elements—i.e., the mapping of CSS Gen El to true or false values reflecting whether (or not) those elements are used by components in the report 46 or, regardless, whether they have been deprecated or otherwise blacklisted—as a so-called component usage map 60. As noted above, this can be represented in tables, arrays, linked lists or otherwise; moreover, it can be stored internal to the optimizer 56, the engine 22, the server 12 or otherwise. In embodiments operating in real-time mode, it can be stored to the requesting client device 14-18, in addition or instead.

In step 408, the optimizer 56 maps each CSS generation element identified in step 400 as used by a component in the usage report to one or more formats available to that element. This allows the comparison of formats that are possibly used (i.e., as defined in the "Skin" rule mentioned above) with the formats that crawler had seen as being used, skipping the generation of CSS for any Formats that aren't used.

As used above and throughout, a "format" is a collection of CSS styles that are used together to provide a particular look (e.g., a "bold button" definition that calls for boldface text and a rounded rectangle outline with a 2 px border). In the illustrated embodiment, the mapping by the optimizer in step 408 of CSS to Gen El to formats is 1 to m, where m is an integer greater than or equal to one.

In step 410, the optimizer 56 supplements the mapping generated in step 408 to include synonyms of the formats generated by that prior step. Such synonyms can be obtained from definition files (not shown here), entered by an administrator or otherwise. Additional formats required for a given implementation, e.g., formats for standard fonts and colors used by a given enterprise, website or otherwise, can likewise be added in step 412.

In step 414, the optimizer 56 stores the resultant mapping of CSS generation elements—i.e., the mapping of CSS Gen El to formats, their synonyms and required formats—as a so-called format usage map 62. As noted above, this can be represented in tables, arrays, linked lists or otherwise; moreover, it can be stored internal to the optimizer 56, the engine 22, the server 12 or otherwise. In embodiments operating in real-time mode, it can be stored to the requesting client device 14-18, in addition or instead.

FIG. 5 depicts further operation of the CSS optimizer 56 according to one practice of the invention; here, in regard to generating a listing 64 of the subset of CSS style feature-related files not necessary for instantiation of the model app 42 for given combination of portal, device and/or user role.

The listing is generated from the crawler usage report 46 and the usage maps 60, 62. Significantly, it is also generated from a base listing 66 of the set of files containing CSS source code associated with model app 42 for all combinations of portal, device and user role. That base listing is referred to, here, as the pzBase. The listing 66 may be generated automatically, e.g., by a integrated development environment, or by an administrator or other person, and/or by a combination of the foregoing, and it may be a text file, binary or otherwise, all as is within the ken or those skilled in the art in view of the teachings hereof.

In step 500, the optimizer 56 stores to the file containing listing 64 (which file may be a text file, binary or otherwise, as is within the ken of those skilled in the art in view of the teachings hereof) the names or other identifiers of files listed in the pzBase file 66 which are blacklisted, e.g., as reflected in the store discussed above in connection with step 306.

In step 502, the optimizer 56 stores to the file containing listing 64 the names or other identifiers of files listed in the pzBase file 66 which contain CSS generation elements that are not necessary for instantiation of the model app 42 for a given combination of portal, device and/or user role, e.g., as evident from the report 46 and/or maps 60 and 62.

In step 504, the optimizer 56 stores to the file containing listing 64 the names or other identifiers of files listed in the pzBase file 66 which reflect formats that are not used for CSS generation elements for instantiation of the model app 42 for a given combination of portal, device and/or user role, e.g., as evident from the report 46 and/or maps 60 and 62.

In step 506, the optimizer 56 stores to the file containing listing 64 the names or other identifiers of files listed in the pzBase file 66 which are associated with user interface components that are not necessary for instantiation of the model app 42 for a given combination of portal, device and/or user role, e.g., as evident from the report 46 and/or maps 60 and 62.

In step 508, the optimizer 56 stores to the file containing listing 64 the names or other identifiers of files listed in the pzBase file 66 which contain CSS generation elements and user interface components that are not necessary for instantiation of the model app 42 for a given combination of portal, device and/or user role, e.g., as evident from the report 46 and/or maps 60 and 62.

In step 510, the optimizer 56 stores to the file containing listing 64 the names or other identifiers of files listed in the pzBase field 66 associated with user interface components for which formats are not necessary for instantiation of the model app 42 for a given combination of portal, device and/or user role, e.g., as evident from the report 46 and/or maps 60 and 62.

In step 510, the optimizer 56 stores to the file containing listing 64 the names or other identifiers of files listed in the pzBase file 66 associated with user interface components for which features are not necessary for instantiation of the model app 42 for a given combination of portal, device and/or user role, e.g., as evident from the report 46 and/or maps 60 and 62.

Steps 500-512 can be run in parallel, in serial and/or in any order or combination in order to generate the listing 64, which may be internal to the optimizer 56, the engine 22, the server 12 or otherwise. In embodiments operating in real-time mode, it can be stored to the requesting client device 14-18, in addition or instead.

Figure 6:
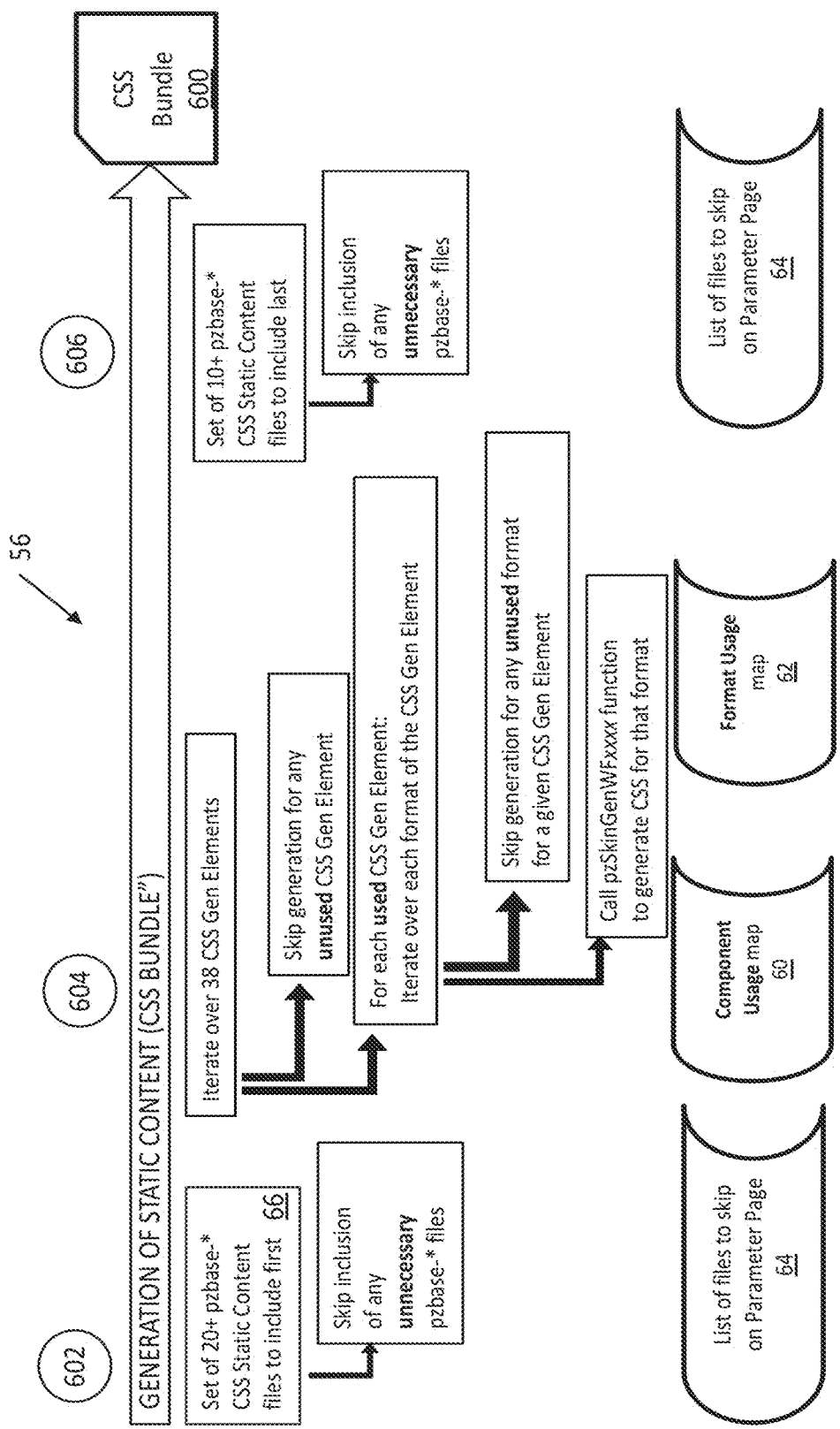
FIG. 6 depicts generation of a style sheet bundle in a system according to one practice of the invention.

FIG. 6 depicts generation of a style sheet bundle 600 ("CSS Bundle" or "static content"), i.e., a collection of style feature-related files, for instantiation of the model app 42 for given specific combination of portal, device and/or user role. In the illustrated embodiment, this is done in three phases: a first phase 602 that includes selected files from the pzBase listing in file 66; a second phase 604 that includes selected CSS generation elements; and a third phase 606 that includes additional files selected from the pzBase listing 66. Other embodiments may utilize a greater or lesser number of phases.

In phase 602, the optimizer 56 prepares for download to the requesting device as part of the CSS Bundle 600 the set of files in base listing 66 (FIG. 4) that are not in the listing 64 of the subset of files not necessary for instantiation of the model app 42 for a specific portal, device and/or user role combination. In some embodiments, the set can be the entirety of the files in base listing 66; however, in the illustrated embodiment, it is just those files that are designated for initial download. Typically, these are file associated with style sheets corresponding to JavaScript that will be loaded as soon as a page (or other screen) of the instantiation of app 42 begins execution on the requesting client device.

In phase 604, the optimizer 56 iterates over CSS generation elements contained in store 58 (FIG. 4), skipping over any listed in listing 64 and/or marked in format usage map 62 as unused for the specific portal, device, and/or user role combination. For each used (i.e., not skipped) generation element, the optimizer 56 iterates over each format potentially used by that element (e.g., as reflected in store 58 or otherwise) skipping over any formats listed in listing 64 and/or marked in component usage map 60 as unused for the specific portal, device, and/or user role combination. For each used (i.e., not skipped) format, the optimizer generates a cascading style sheet (or entry) for that format and prepares it for download as part of the CSS Bundle 600.

In phase 606, the optimizer 56 prepares for download to the requesting device as part of the CSS Bundle 600 remaining files in the set of in base listing 66 (FIG. 4) that are not in the listing 64 of the subset of files not necessary for instantiation of the model app 42 for a specific portal, device and/or user role combination. In the set comprises those in listing 66 that are designated for final download. Typically, these are file associated with style sheets loaded at the ends of a page (or other screen) of the instantiation of app 42 after it begins execution on the target client device.

In embodiments operating in real-time mode, the bundle 600 can be downloaded to a target client device 14-18 at the time of its request and in connection with the download of JavaScript files to those devices. In embodiments operating in batch mode, the CSS bundle can be generated for download at a later time, or its generation and download can be deferred until corresponding requests are received, or otherwise, all as is within the ken of those skilled in the art in view of the teachings hereof.

Figure 7:
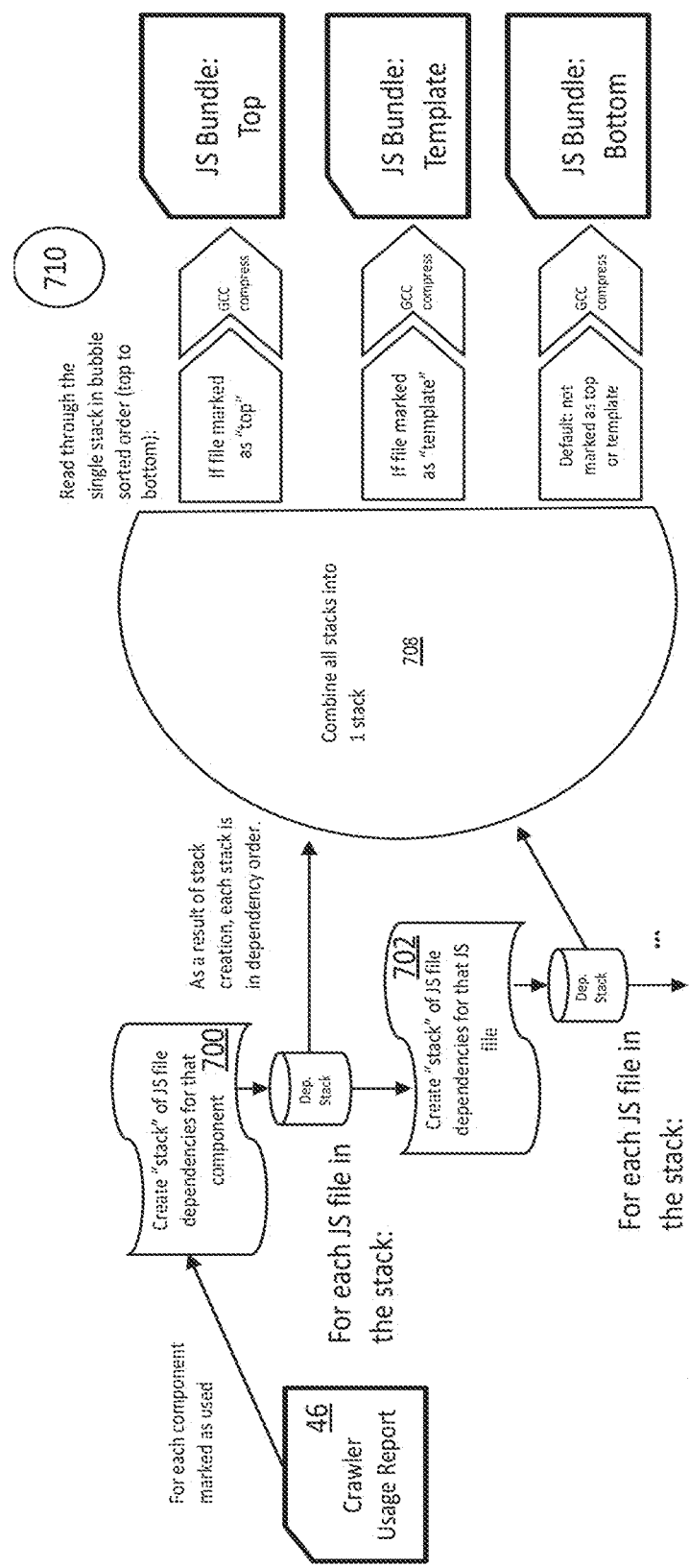
FIG. 7 depicts operation of an optimizer in a system according to one practice of the invention.

FIG. 7 depicts generation of JavaScript source code files for download and execution in connection with a specific combination of portal, device and/or user role as discussed above in connection with steps 206-210; here, shown as steps 700-710.

As shown in the drawing, the crawler usage report 46 provides an input to the illustrated processing sequence. That report 46 contains, as evident in the discussion above, a list of components used/unused in an instantiation of model 42 for download to the specific portal, device and/or user role. In addition, for each component that is marked as used, the report 46 includes a listing of features of that component, with each of them marked as used/unused, as well.

For each component in the report 46 marked as used by the specific portal/device/user-role combination, the JS optimizer 48 performs the recursive step(s) below and illustrated in the drawing:

Step 700: Create a "stack" of JS file dependencies for the component and store it for further processing. For each JS file in that stack, the JS optimizer 48 performs the step(s) of:

Step 702: Create a "stack" of JS file dependencies for the component and store it for further processing. For each JS file in that stack, the JS optimizer 48 performs the step(s) of:

Create a "stack" of JS file dependencies for the component and store it for further processing.

Etc.

The depth-and-breadth recursive descent stops when one of the recursive processing steps 700, 702, etc.:

(a) results in an empty dependency list (leaf node), (b) results in a "cycle," that is, uncovers a dependency already represented in an existing stack.

Stacks built as a result of recursive processing steps 700, 702, etc., can be illustrated by the following example, which assumes that the report contains records identifying user interface components U1 through U3 and JavaScript components A through I as used for a specific portal/device/user-role combination, with the following dependencies (where "→" means "depends on"), including a circular dependency, reflected above, to wit, A→B→C→A . . . (etc.):

User Interface (U)I Components:

U1→A

U2→D

U3→A and G

JavaScript Files:

A→B

B→C

D→E

E→F

G→H and I

C→A (circular)

As a result of the processing in steps 700, 702, etc., a stack is built for each JavaScript component or JS file encountered in the report 46. Specifically, when a component or JS file is encountered, a dependency stack is created for that component/file (if one doesn't exist). Then, its dependencies are opened in the order they appear (which can cause creation of that component/file dependency stack, etc.). Then, as the recursion is "unwound", the "child" dependencies are read and pushed onto the "dependent's" stack.

In the illustrated embodiment, UI components themselves are not placed in a stack; only the JS components they are dependent upon are. Moreover, UI components do not depend upon other UI components; they are only dependent on JS components. However, in the illustrated embodiment JS components can be dependent upon other JS components and therefore can create circular references, e.g., as illustrated below.

For the specific example above, the annotations below show the order of the stacks being created, added to, etc. Further explanation is provided parenthetically.

U1 triggers a stack for A and subsequently B and C, as follows:
    Stack for A: B, (get stack B→C, A) stop at repeat, result: B, C
    Stack for B: C, (get stack C→A, B) stop at repeat, result: C, A
    Stack for C: A, (get stack A, stack A is in progress, so retrieve what it has, namely B), result: A, B
U2 triggers a stack for D and subsequently E, as follows:
    Stack for D: E (get stack E→F), result: E, F
    Stack for E: F (leaf)
U3 triggers for stack A (already done previously) and a stack G, as follows:
    Stack for A: B, C
    Stack for G: H (leaf), I (leaf)
As a result of the foregoing, the following stacks are built:
    Stack for U1: A, (get stack A→B, C), result: A, B, C
    Stack for U2: D, (get stack D→E, F), result: D, E, F
    Stack for U3 A (get stack A→B, C), G (get stack G→H, I), result: A, B, C, G, H, I
Combining U1, U2 and U3 dependency stacks produces the following:
    U1: A, B, C
    Add U2: A, B, C, D, E, F
    Add U3: ~~A, B, C,~~ D, E, F, A, B, C, G, H, I The final contents of the new (combined) stack can be read as file needing to be loaded in reverse order. In the example, this means load I, then load H, then G, etc. This also means C will be loaded before B which will be loaded before A, as the dependency indicates. These data representations also allow the optimizer 48 to note that a cyclic dependency remains (A needs to be loaded before C and C needs to be loaded before B which loads before A) indicating work that needs to be resolved in the code, e.g., by generating a warning message to an administrator or other. As a consequence, the optimizer 48 is able to generate a single dependency stack (reverse order—which is the desired load order). In this example, that would be
    I, H, G, C, B, A, F, E, D In step 710, the JavaScript optimizer 48 prepares for transfer to and loading on a requesting client device 14-18 the source code files identified in the dependency-ordered stack generated in step 708. The optimizer 48 prepares for such transfer in an order that is based on the dependency order specified in that stack. In embodiments, in which the steps 700-710 are executed in real-time mode, the optimizer 48 can, alone or in cooperation with other elements of server 12, proceed with transfer of those files in that order, via HTML stream or otherwise, as is within the ken of those skilled in the art in view of the teachings hereof. Where, on the other hand, steps 700-710 are executed in batch mode the optimizer can delay such transfer until such a corresponding request is received. In either case, the transfer of files can be effected in a conventional manner known in the art, e.g., via a compiler (e.g., GCC) or otherwise.

CONCLUSION

Described herein are systems and methods meeting the objects set forth above among others. It will be appreciated that the illustrated embodiments are merely examples of the invention and that other embodiments varying therefrom fall within the scope of the invention. Thus, for example, although in the illustrated embodiments, the illustrative app 42 comprises rules from rules base 24, in other embodiments it may comprise software of other varieties from other repositories. This is likewise true of optimization application 32. And, while the illustrated embodiment is designed to process JavaScript file source code, other embodiments may process source code in other languages. Other aspects of the invention provide methods, e.g., as described above, for identifying for download to a requesting client device a set of user interface components, features of those components, and formats of those components or features, used in execution of an app on a client digital data devices by users having a plurality different respective roles and/or portals from which they request transfer of the app for loading and execution.

In view of the foregoing, what we claim is:

1. A method of optimizing an app for any of download to and execution on a client digital data device, comprising
   (A) identifying a plurality of components used in execution of the app on the client digital data device by a user of that device having at least one of a designated role and a designated portal via which the client digital data device requests transfer of the app, where said components comprise any of source code files or portions thereof, including user interface components, and where said role is an access group,
   (B) for each component identified in Step (A): identifying source code files on which execution of that component in connection with execution of the app by the user depends, and generating for that component a dependency-ordered stack of the source code files so identified,
   (C) combining the dependency-ordered stacks generated in step (B) into a single dependency-ordered stack,
   (D) transferring to the client digital data device for loading and execution thereon the source code files identified in the single dependency-ordered stack, where the source code files are transferred based on a dependency order specified in the single dependency-ordered stack.

2. The method of claim 1, wherein step (B) comprises recursively iterating, in both depth and breadth, through the components identified in step (A) and, in turn, through the components on which they depend, creating a dependency stack for each component encountered during such recursive iteration if none exists.

3. The method of claim 1, wherein step (C) comprises using a bubble sort to combine the dependency-ordered stacks generated in step (B) into a single dependency-ordered stack.

4. The method of claim 2, wherein step (C) comprises iteratively appending one of the dependency-ordered stacks generated in step (B) to an intermediate stack and deleting prior entries in that intermediate stack.

5. The method of claim 1, wherein step (D) comprises transferring the source code files to the client digital data device in multiple bundles, where the source code files transferred in each bundle is based on the dependency order specified in the single dependency-ordered stack.

6. The method of claim 3, wherein the multiple bundle includes at least two of
(i) a top bundle comprising source code loaded as soon as page is visible upon execution of the app on the client digital data device by the user,
(ii) a template bundle comprising source code loaded before control rendering begins upon execution of the app on the client digital data device by the user, and
(iii) a bottom bundle comprising source code loaded at an end of an initial page load upon execution of the app on the client digital data device by the user.

7. The method of claim 1, wherein step (A) comprises crawling the app source code starting at an entry point and recursively descending in both depth and breadth to identify the components used in execution of an app on the client digital data device by the user.

8. The method of claim 7, wherein step (A) includes
(i) crawling designated components even if they will not be used in execution of the app on the client digital data device by the user, and
(ii) not crawling designated components even if they will be used in execution of the app on the client digital data device by the user.

9. A method of optimizing an app for any of download to and execution on a client digital data device, comprising
(A) identifying, in style sheets, a set of
(i) user interface components,
(ii) features of those user interface components, and
(iii) formats of those user interface components or features,
used in execution of the app on client digital data devices by users having a plurality of different respective roles and/or portals from which they request transfer of the app for loading and execution,
(B) identifying a subset of said user interface components, features and formats that are not used in execution of the app on the client digital data device by a user having at least one of a designated role and a designated portal from which the client digital data device requests transfer of the app for loading and execution,
(C) transferring to the client digital data device for loading and execution thereon those style sheets files that define the set but that are not in the subset.

10. The method of claim 9, comprising generating and transferring to the client digital data device for loading and execution thereon those source code files that define the set but that are not in the subset, while foregoing at least one of generating and transferring those source code files that define the subset.

11. The method of claim 10, wherein source code files defining formats of the user interface components comprise cascading style sheets (CSS).

12. A method of optimizing an app for execution on client digital data devices, comprising
(A) identifying, in source code files, a set of
(i) user interface components,
(ii) features of those user interface components, and
(iii) formats of those user interface components or features,
used in execution of the app on the client digital data devices by users having a plurality of different respective roles and/or portals from which they request transfer of the app for loading and execution,
(B) identifying a first subset of said user interface components, features and formats that are not used in execution of the app on a client digital data device by a user having at least one of a first designated role and a first designated portal from which a first client digital data device requests transfer of the app for loading and execution,
(C) identifying a second subset of said user interface components, features and formats that are not used in execution of the app on the client digital data device by the user having at least one of a second designated role and a second designated portal from which a second client digital data device requests transfer of the app for loading and execution,
(D) transferring to the first client digital data device for loading and execution thereon source code files that define the set but that are not in the first subset of said user interface components, features and formats, and
(E) transferring to the second client digital data device for loading and execution thereon those source code files that define the set but that are not in the second subset of said user interface components, features and formats.

13. The method of claim 12, comprising
generating and transferring to the first client digital data device for loading and execution thereon those source code files that define the set but that are not in the first subset, while foregoing at least one of generating and transferring to the first client digital data device for loading and execution thereon those source code files that define the first subset, and
generating and transferring to the second client digital data device for loading and execution thereon those source code files that define the set but that are not in the second subset, while foregoing at least one of generating and transferring to the second client digital data device for loading and execution thereon those source code files that define the second subset.

14. The method of claim 10, wherein source code files defining formats of the user interface components comprise cascading style sheets (CSS).

15. A method of optimizing an app for any of download to and execution on a client digital data device, comprising
(A) identifying a plurality of components used in execution of the app on the client digital data device by a user of that device having at least one of a designated role and a designated portal from which the client digital data device requests transfer of the app for loading and execution, where the components comprise source code files or portions thereof, including user interface components,
(B) for each component identified in Step (A), identifying source code files on which execution of that component in connection with execution of the app by the user depends, and generating for that component a dependency-ordered stack of the source code files so identified,
(C) combining the dependency-ordered stacks generated in step (B) into a single dependency-ordered stack,
(D) identifying a set of said user interface components, features of those user interface components, and formats of those user interface components or features used in execution of the app on client digital data devices by users having a plurality different respective roles and portals from which the respective client digital data devices request transfer of the app for loading and execution, (E) identifying a subset of said user interface components, features and formats not used in execution of the app on the client digital data device by the user having at least one of a designated role and a designated portal from which the client digital data device requests transfer of the app for loading and execution, (F) transferring to the client digital data device for loading and execution thereon those source code files that define the set but that are not in the subset.

* * * * *